US012580638B2

(12) United States Patent (10) Patent No.: US 12,580,638 B2
Duyck et al. (45) Date of Patent: *Mar. 17, 2026

(54) SATELLITE COMMUNICATION SYSTEM

(71) Applicant: ST ENGINEERING IDIRECT (EUROPE) CY NV, Sint-Niklaas (BE)

(72) Inventors: Dieter Duyck, Sint-Niklaas (BE); Brecht Reynders, Mechelen (BE)

(73) Assignee: ST ENGINEERING IDIRECT (EUROPE) CY NV, Sint-Niklaas (BE)

( * ) Notice: Subject to any disclaimer, the term of this patent is extended or adjusted under 35 U.S.C. 154(b) by 670 days.

This patent is subject to a terminal disclaimer.

(21) Appl. No.: 18/067,281

(22) Filed: Dec. 16, 2022

(65) Prior Publication Data

US 2023/0123805 A1 Apr. 20, 2023

Related U.S. Application Data

(63) Continuation-in-part of application No. 17/280,423, filed as application No. PCT/EP2019/076257 on Sep. 27, 2019, now Pat. No. 11,558,109.

(30) Foreign Application Priority Data

Sep. 28, 2018 (BE) .................................. 2018/5665

(51) Int. Cl.
H04B 7/185 (2006.01)

(52) U.S. Cl.
CPC ..... H04B 7/18517 (2013.01); H04B 7/18513 (2013.01)

(58) Field of Classification Search
None
See application file for complete search history.

(56) References Cited

U.S. PATENT DOCUMENTS 11,558,109 B2 * 1/2023 Duyck .............. H04B 7/18517
2014/0119458 A1 5/2014 Limberg
(Continued)

FOREIGN PATENT DOCUMENTS

EP 2073400 B1 12/2011
EP 3158658 A1 4/2017
(Continued)

OTHER PUBLICATIONS

Maglaris et al., "Performance Models of Statistical Multiplexing in Packet Video Communications," IEEE Transactions on Communications, vol. 36, No. 7, Jul. 31, 1988, pp. 834-844.
(Continued)

*Primary Examiner* — Minh Trang T Nguyen
(74) *Attorney, Agent, or Firm* — Workman Nydegger

(57) ABSTRACT

An earth station transmitter device is arranged for generating a signal to be transmitted to a plurality of earth station receiver devices of a satellite communication system. The device includes a plurality of shapers, such that each shaper is arranged for shaping for data traffic to a different subset of earth station receiver devices a symbol rate; a modulator includes a time slice selector arranged for receiving and storing the groups of time slices outputted by the plurality of shaping means; and a controller is adapted to monitor the modulator and to convey to at least one of the shaping means based on the monitoring an update of the symbol rate shaped by the at least one shaping means.

19 Claims, 6 Drawing Sheets

(56) References Cited

U.S. PATENT DOCUMENTS

| | | | |
|---|---|---|---|
| 2018/0019800 | A1 | 1/2018 | Buer et al. |
| 2018/0278324 | A1 | 9/2018 | Qin et al. |

FOREIGN PATENT DOCUMENTS

| | | | |
|---|---|---|---|
| WO | 2006099695 | A1 | 9/2006 |
| WO | 2018092132 | A1 | 5/2018 |

OTHER PUBLICATIONS

Vidal et al., "Next Generation High Throughput Satellite System,"
EADS Astrium and ISAE, May 15, 2012, pp. 1-7.
"DVB-S2X Wideband Modulator: L-band Output," Work Micro-
wave, Feb. 9, 2016, pp. 1-4.
Mocker et al., "Time Slicing," Work Microwave, Mar. 13, 2016, 2
Pages.
Search Report and Written Opinion from corresponding Belgium
Application No. 201805665, Apr. 30, 2019.
International Search Report and Written Opinion from PCT Appli-
cation No. PCT/EP2019/076257, Oct. 29, 2019.

* cited by examiner

Configuration

SATELLITE COMMUNICATION SYSTEM

FIELD OF THE INVENTION

The present invention is generally related to the field of satellite communication systems.

BACKGROUND OF THE INVENTION

Satellite communication services are important in various fields since many decades. Consider for example Internet over satellite for consumers, but also for enterprises (e.g. oil rigs) and government and defense applications.

One-way and two-way communication services are considered. In two-way satellite communication services there is a link from a hub to a terminal, called the forward (FWD) link, and a link from the terminal to the hub, called the return (RTN) link. In a one-way service, only the FWD link is used. A typical realization of data communication over a (two-way) satellite network is based on a star network as illustrated in FIG. 1. A hub or gateway (1) communicates with a terminal (3) via at least one satellite (2). In such a system multiple terminals may be covered through a single hub. A satellite communication service may contain several hubs. A hub may contain several transmitters and/or receivers, e.g., if the bandwidth needed in the forward link is larger than the bandwidth that can be transmitted from a single transmitter. The receive terminals to which the traffic can potentially be combined in a single frame, are grouped in a satellite network, referred to as a satnet. These terminals decode a same carrier at the same time in a same contour. A satnet processor (e.g., a central processing unit (CPU) processor on a blade server) is responsible for handling forward and return (also referred to as inbound and outbound) traffic associated to a satnet. A blade server is a stripped-down server computer with a modular design optimized to minimize the use of physical space and energy.

A satellite communication system is considered wherein in the forward link a satnet processor (e.g. a processor on a blade server) multiplexes data (also referred to as traffic) to a group of terminals in a frame which is then sent to the modulator (e.g. over an Ethernet cable or over a coaxial cable). Such a frame is for example a baseband frame, but it can also be another type of frame. The two essential components of the satnet processor are referred to as a shaper and an encapsulator. The average speed or rate at which such frames are sent to the modulator, depends on the average rate at which data for this satnet is transmitted over the air (typically equal to a symbol rate of a transmitted carrier or a fraction thereof in the case of time slicing, see DVB-S2 Annex M or DVB-S2X Annex M). The average symbol rate shaped by the satnet processor is referred to as the satnet size. Due to the cost of the satnet processor, there is often a need to maximize the satnet size achievable by the satnet processor.

In the transmitter part of prior art satellite communication systems a shaper-encapsulator shapes a physical carrier symbol rate, i.e., it sends sufficient baseband frames (in the form of a sequence of bits) to the modulator such that the modulator can encode and modulate the bits onto an RF carrier at a particular symbol rate to fill the physical carrier without buffer overflow in the modulator. Thus, one physical carrier is used for data traffic of exactly one satnet. The traffic from multiple users in exactly one satnet is multiplexed in the same carrier, whereby the multiplexing takes into account jitter requirements, traffic priority classes, the adoption of a beam hopping or non-beam hopping satellite, based on link budgets and on the symbol rate and the link budget per user. The more users are multiplexed in the same satnet, the larger the so-called statistical multiplexing gains (i.e., the probability that all users request data at the same time reduces when considering more users, which allows to have more "overbooking" when considering more users). Hence, larger satnet sizes can allow more users to be multiplexed in the same satnet, which allows doing more "overbooking" resulting in efficiency gains. Hence, there is a need to maximize satnet sizes to maximize efficiency gains, next to minimizing capital expenditures on satnet processors as explained before. This complex process takes place in the satnet processor. The process is referred to as shaping-encapsulation, as discussed e.g., in WO2006/099695. The modulator then encodes and modulates the baseband frames into physical layer frames consisting of complex-valued symbols (at a rate equal to the physical carrier symbol rate) and finally an RF signal (typically with a 3-dB bandwidth equal to the physical carrier symbol rate when using Nyquist signalling).

Time slicing was standardized In ETSI EN 302 307: "Digital Video Broadcasting (DVB); Second generation framing structure, channel coding and modulation systems for Broadcasting, Interactive Services, News Gathering and other broadband satellite applications", annex M) and also in ETSI EN 302 307-2 V1.1.1 (2014-10): "Digital Video Broadcasting (DVB); Second generation framing structure, channel coding and modulation systems for Broadcasting, Interactive Services, News Gathering and other broadband satellite applications; Part 2: DVB-S2 Extensions (DVB-S2X)", here-after referred to as DVB-S2X. In the sharing mechanism implemented by time slicing, receivers only decode frames which have a frame tag or slice number associated to the group of receivers they belong to.

The need for time slicing has come through the introduction of very wideband transmissions over high throughput satellites. Very high throughput satellites (HTS), where single transponders have large bandwidths (for example, in the order of 500 MHz), have significantly reduced the cost per Mbit for satellite communications and are therefore omnipresent in applications like broadband, mobile and enterprise connectivity (see O. Vidal et al., "Next generation high throughput satellite system," IEEE AESS Eur. Conf. on Sat. Telecom. (ESTEL), 2012). The data demand in a satellite network is typically greatest in the forward link from gateway over satellite to terminal, as users typically have higher download demands than upload demands. Thus, the number of subscribers is typically limited due to the available bandwidth in the forward link. Hence, the achievable bandwidth of the forward link carrier is typically a differentiator. This bandwidth has increased dramatically with the introduction of HTS. The consequence, however, is that all receivers in the satellite network must be able to process this huge bandwidth, which is illustrated in FIG. 1. Typically, the throughput of the coded bits is limited due to decoder throughput limitations at the receiver. Also, the clock speed at which buffers are read is limited at receivers. Time slicing, as explained in ETSI EN 302 307, has been proposed in EP2073400 B1. When performing time slicing, receiver terminals are subdivided in groups which each only decode a subset of the frames, said subset of frames identified through an associated frame tag or slice number. ETSI EN 302 307 explains which encoder to use to encode the time slice number in the physical layer header (the first 180 complex-valued symbols of a physical layer frame, in the case of ETSI EN 302 307). This allows a receiver to only decode the physical layer header to decide whether it is required to further decode the entire frame or not.

However, it remains unclear how to organize a gateway in order to make sure there is sufficient time between two frames of the same slice, so that receivers with decoders having lower throughput specifications have no packet loss due to throughput violations. More specifically, ETSI EN 302 307 does not standardize or explain shaper-encapsulators. It assumes the input stream or streams at the modulator input to be such that the number of symbols per second to be transmitted are not higher than the symbol rate of the physical carrier. Further, it does not explain how to merge or multiplex baseband frames with different slice numbers into a single stream of baseband frames. To avoid any misunderstanding, the merger/slicer explained in ETSI EN 302 307 does not mention anything on a minimum guard time between baseband frames with the same time slice number (where time slice number is referring to the time slicing in Annex M).

Prior art solutions concerning shaper-encapsulators (e.g., as in the above-mentioned WO2006/099695) have a 1-to-1 relation between shaper-encapsulators and physical carriers. That is, a shaper-encapsulator bursts frames at a rate that fits just in the physical carrier symbol rate. It is not clear how such a prior art shaper-encapsulator has to meet a requirement that frames transmitted with the same slice number be sufficiently spaced in time, given that the shaper-encapsulator acts in a processor which is not in the same clock domain as the modulator on the FPGA. Shaper-encapsulators furthermore shape symbol rates while the constraints are expressed in coded throughput rates.

Further, the impact of transmitting consecutive frames with different time slice numbers but also different modcods, e.g., a 32-APSK and a QPSK modcod is not clear either.

The beam hopping satellite communication system presented in WO2018/92132 exploits a transmit-receive framing mechanism to simplify scheduling, streamline satellite and beam switchover. Most of the complexity involved in routing and handover is shifted from the satellite to the gateway and the terminals. The communication channel is transmitted in burst communication mode such that transmission signal includes transmission data time slots at which one or more of said communication frames are encoded in the signal and one or more recess time slots between them. The communication receiver is adapted for processing signals of the burst mode communication channel and processes at least a portion of a signal received in the communication channel after a recess time period during which communication frames were not transmitted to determine a carrier frequency of the communication channel.

Hence, there is a need to extend nowadays systems in a modular, simple and cost efficient way so that they are able to address time slicing, without introducing new inefficiencies and while maximizing satnet sizes shaped by the shaper-encapsulators, so that required capital expenditures in satnet processors are minimized and statistical multiplexing efficiency gains maximized.

SUMMARY OF THE INVENTION

It is an object of embodiments of the present invention to provide for a cost-effective transmitter reusing off-the-shelf solutions for a satellite communication system wherein time slicing can be applied without causing inefficiencies.

The above objective is accomplished by the solution according to the present invention.

In a first aspect the invention relates to an earth station transmitter device arranged for generating a signal to be transmitted to a plurality of earth station receiver devices of a satellite communication system. The earth station transmitter device comprises a plurality of shaping means, each arranged for shaping and encapsulating data traffic to a different subset of earth station receiver devices, so obtaining for each subset a virtual carrier outputting at an average equivalent symbol rate denoted a virtual carrier symbol rate a plurality of virtual carrier baseband frames, a modulator comprising a time slice selector arranged for receiving and storing said virtual carriers outputted by said plurality of shaping means, for selecting a stored virtual carrier baseband frame from a list of allowable virtual carriers as next frame to be multiplexed on a single stream, and for assigning to said selected virtual carrier baseband frame, from a list of allowable time slice numbers, a time slice number associated to the virtual carrier to which said selected virtual carrier baseband frame belongs, said modulator further comprising encoding and modulation means to convert said single stream into symbols of a continuous physical carrier to be transmitted at a physical carrier symbol rate greater than or equal to the sum of said virtual carrier symbol rates, a central unit arranged for conveying to each shaping means of said plurality its virtual carrier symbol rate and for conveying to said modulator a list of possible time slice numbers for each of said virtual carriers.

The proposed solution indeed allows for performing time slicing. A time slice selector in the modulator receives and stores virtual carrier baseband frames from at least two virtual data carriers, which each have their own virtual carrier symbol rate. A central unit is in control and informs the various shapers of the virtual carrier symbol rate that can be applied. The shaping means, also referred to as shapers, perform shaping and encapsulation. The time slice selector is further capable of selecting one of the stored frames as next frame to be put on the single stream and of assigning a time slice number to the selected virtual carrier baseband frame. The encoding and modulation means then convert the single stream into symbols of a continuous physical carrier to be transmitted. Continuous is hereby to be construed as without any guard time: all frames are transmitted back-to-back. Note that in absence of user data, frames without useful data are inserted in the single stream in order to keep transmitting frames back-to-back. One of the most interesting features of applying time slicing is that by doing so receivers get more time to decode frames. The proposed solution is modular and cost-effective as off-the-shelf shapers are reused to shape and encapsulate to a given, here virtual carrier, symbol rate. Also, off-the-shelf encoding and modulation means are reused.

The invention relates to an earth station transmitter device arranged for generating a signal to be transmitted to a plurality of earth station receiver devices of a satellite communication system. The earth station transmitter device comprises:

a plurality of shaping means, each arranged for shaping for data traffic to a different subset of earth station receiver devices a symbol rate, so obtaining for each subset a group of time slices outputting at said symbol rate for said group of time slices a plurality of baseband frames, and for encapsulating the data traffic, a modulator comprising a time slice selector arranged for receiving and storing in storage means said groups of time slices outputted by the plurality of shaping means, for selecting a stored baseband frame of a group of time slices from a list of allowable groups of time slices as next frame to be multiplexed on a single stream, and for assigning to the selected baseband frame, from a list of allowable time slice numbers, a time slice number associated to the group of time slices to which said selected baseband frame belongs, said modulator further comprising encoding and modulation means to convert the single stream of baseband frames into symbols of a continuous physical carrier to be transmitted at a physical carrier symbol rate greater than or equal to the sum of the symbol rates of said groups of slices, and a controller adapted to monitor the modulator and to convey to at least one of the shaping means based on said monitoring an update of the symbol rate shaped by the at least one of shaping means.

The symbol rate for the group of time slices is the virtual symbol rate already mentioned above.

In preferred embodiments the update is a reduced symbol rate if a processed queue size of the storage means is increasing. In other embodiments the update is an increased symbol rate if a processed queue size of the storage means is decreasing or remains constant. In yet other embodiments the update is a reduced symbol rate if the processed number of fill frames inserted into said group of time slices of said at least one shaping means is decreasing. Alternatively, the update is an increased symbol rate if the processed number of fill frames inserted into the group of time slices of the at least one shaping means is equal to or greater than a given threshold value. In one embodiment the term 'processed' refers to taking an average of a set of consecutive samples, for example 10 consecutive samples.

In preferred embodiments the selected virtual carrier baseband frame is the virtual carrier baseband frame from said list of allowable virtual carriers that was stored longest ago.

In advantageous embodiments the earth station transmitter device comprises a central unit arranged for configuring each shaping means of said plurality with a provisioned symbol rate for its group of time slices and for conveying to the modulator a list of possible time slice numbers for each of the groups of time slices. Preferably the updated symbol rate is upper bounded by the provisioned symbol rate of the at least one shaping means.

In certain embodiments the central unit is also arranged for conveying to the time slice selector indications of throughput limits per time slice number.

Advantageously, the encoding and modulation means is arranged to send a request to the time slice selector to get the next selected virtual carrier baseband frame. The time slice selector then provides, corresponding to the physical carrier symbol rate, sufficient baseband frames to the encoding and modulation means so that the encoding and modulation means only transmit symbols corresponding to the baseband frames received from the time slice selector. In other words, the encoding and modulation means does not insert any extra frame.

Preferably the provisioned symbol rate of at least one of the groups of time slices is upper bounded depending on the modulation orders used in that group of time slices.

In advantageous embodiments the earth station transmitter device comprises an Ethernet switch for receiving the virtual carriers and for multiplexing the virtual carrier baseband frames, said multiplexed virtual carrier baseband frames being sent over a single Ethernet cable to the modulator.

In one embodiment the plurality of shaping encapsulation means is arranged to provide output in data packets, each data packet comprising one or an integer multiple of virtual carrier baseband frames.

In embodiments of the invention the virtual carrier symbol rate of at least one of the virtual carriers is upper bounded depending on the most efficient modulation and coding used in that virtual carrier.

In another aspect the invention relates to a satellite communication system comprising an earth station transmitter device as previously described and a plurality of earth station receiver devices, wherein at least one earth station receiver device of that plurality is arranged to demodulate and decode the symbols of the physical carrier only at a rate lower than the physical carrier symbol rate, said plurality of earth station receiver devices being divided in at least two subsets, each subset corresponding to a different one of the virtual carriers.

In a preferred embodiment the time slice selector is arranged for selecting a non-limited frame to be put in the single stream in case there are no allowed virtual carriers. Preferably the time slice selector is arranged to select a fill frame to be put in the single stream in case there are allowed virtual carriers and there is no baseband frame available in the storage means for the allowed virtual carriers. Preferably the time slice selector is arranged to indicate to the encoding and modulation means the type and number of non-limited frames to be inserted after a particular virtual carrier baseband frame, in case no new virtual carrier baseband frame is found with allowable time slice number. In an embodiment the non-limited frame is the oldest stored baseband frame belonging to a virtual carrier to be received by at least one earth station receiver device of the plurality arranged for demodulation and decoding at the physical carrier symbol rate.

In embodiments the central unit is arranged to keep a separate list of time slice numbers for the at least one earth station receiver device arranged for demodulation and decoding at the physical carrier symbol rate. In absence of baseband frames for the at least one earth station receiver device arranged for demodulation and decoding at the physical carrier symbol rate, the non-limited frame may be a frame that is forced into the single stream by the time slice selector and that is rejected by all earth station receiver devices.

In other embodiments the non-limited frame is a frame that is forced into the single stream by the time slice selector and is rejected by all earth station receiver devices, said frame comprising a header identifying the frame as a dummy frame. In some of the embodiments the frame forced into the single stream is a dummy frame if the physical carrier symbol rate is below a given threshold and a 16APSK or 32APSK normal frame with dummy data above that given threshold.

In embodiments the frame forced into the single stream is a 16APSK or 32APSK normal frame with dummy data. The 16APSK or 32APSK normal frame may be a prestored, already coded frame with dummy data.

In embodiments of the invention at least one of the earth station receiver devices is arranged for demodulating and decoding all frames of the single stream.

In preferred embodiments the list of allowable time slice numbers comprises time slice numbers for which a counter exceeds a first threshold linked to a given throughput limitation per time slice on an earth station receiver device of the plurality, said counter arranged to count a number of symbols transmitted as of and including the last outputted baseband frame assigned to the time slice number.

In certain embodiments the list of allowable virtual carriers comprises virtual carriers, most preferably all, having at least one time slice number on the list of allowable time slice numbers. The list of virtual carriers comprises the virtual carriers for which a further counter exceeds a second threshold related to a jitter specification on an earth station receiver device that can lead to frame reordering, said second counter arranged to count a number of symbols transmitted as of and including the last outputted baseband frame assigned to the virtual carrier.

In embodiments of the invention the central unit is arranged to indicate to a first shaping-encapsulation means an increased provisioned virtual carrier symbol rate, based on congestion of a corresponding satnet and to indicate a decreased provisioned virtual carrier symbol rate to at least one other shaping-encapsulation means, such that the physical carrier symbol rate is greater than or equal to the sum of all provisioned virtual carrier symbol rates.

Advantageously the central unit is arranged to first indicate a decreased provisioned virtual carrier symbol rate to the at least one other shaping-encapsulation means, before indicating an increased provisioned virtual carrier symbol rate to the first shaping-encapsulation means.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
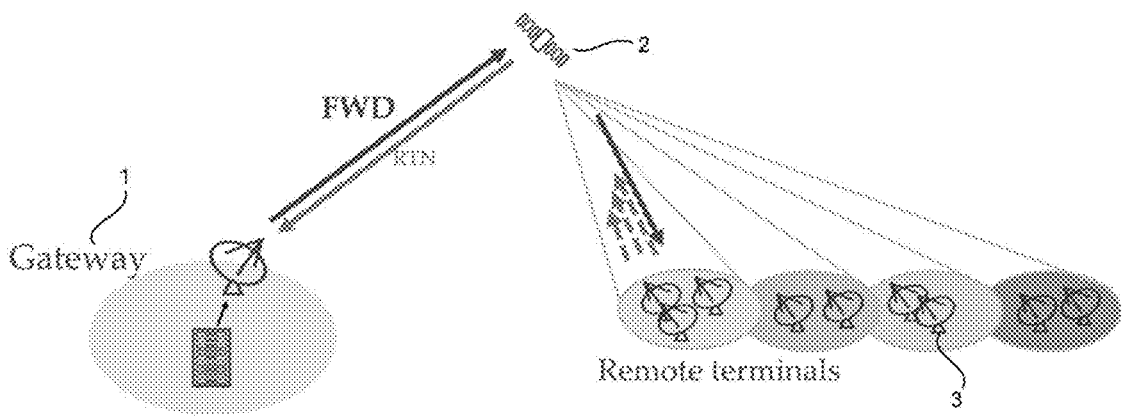
FIG. 1 illustrates a satellite communications system where a hub or gateway (1) communicates with multiple terminals (3) via a satellite (2). The link from gateway to satellite in the forward (FWD) link is typically the bottleneck.

The present invention will be described with respect to particular embodiments and with reference to certain drawings, but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention presents an earth station transmitter device and satellite communication system comprising such an earth station transmitter device that forms a modular, simple and cost-efficient extension of prior art solutions so that they become able of applying time slicing.

Figure 2:
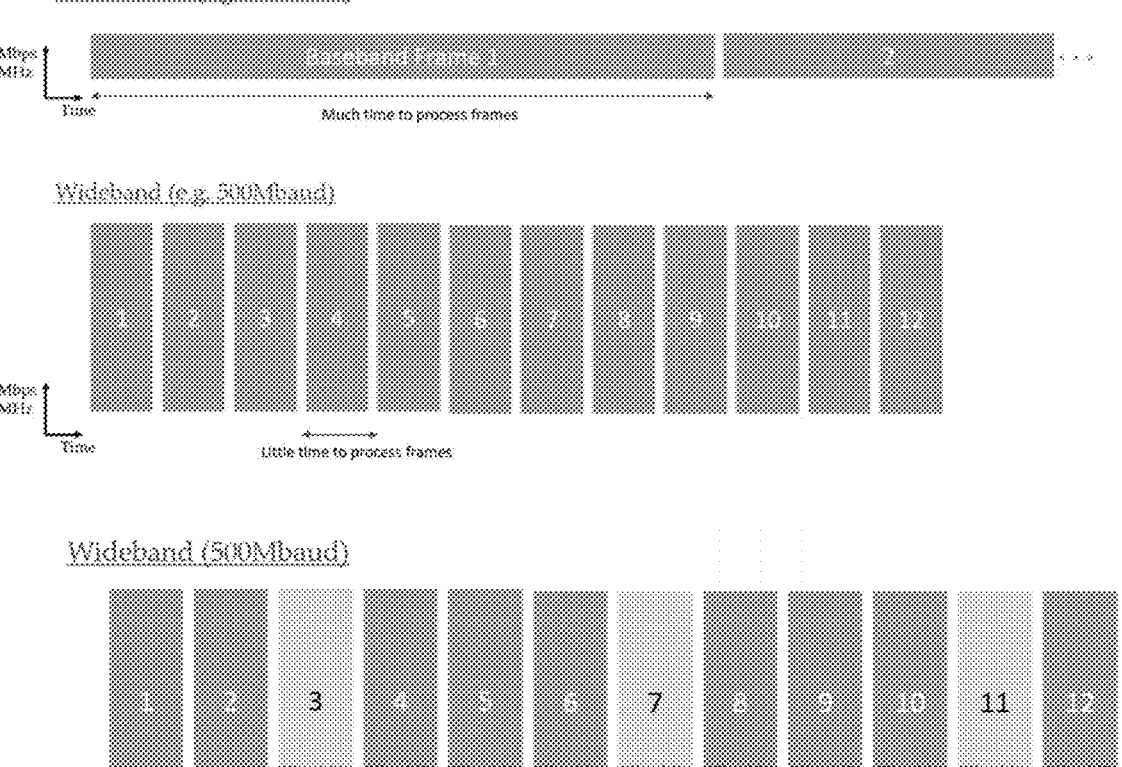
FIG. 2 illustrates the concept of time slicing.

More in particular, the invention proposes in a first aspect an earth station transmitter device which is a scalable and cost efficient extension of transmitters as encountered in state of the art satellite communication systems, allows for wideband (e.g. 500 Mbaud) transmission and statistical multiplexing and is suitable for cooperating with receiver devices having lower throughput specifications. If receivers are used that only allow lower throughput, such receivers need sufficient time to decode their information of interest from the physical carrier. Hence, they cannot decode each subsequent frame of a physical carrier transmitted at a high symbol rate, for instance 500 Mbaud. Therefore, receivers are divided into subsets referred to as a satellite network (satnet), and multiple satnets are served by the same physical carrier. Frames from the same satellite network are assigned a frame tag, denoted a time slice number, as already described previously. This time slice number is encoded in a header of the physical layer frame (also referred to as PL frame, see ETSI EN 302 307) and can be decoded separately. When a receiver does not belong to the satellite network corresponding to a decoded time slice number, that receiver discards the frames sent with that time slice number. As such, receivers get more time to decode the frames of the satellite network they belong to. FIG. 2 provides an illustration. It shows that the processing time needed for demodulation is much shorter in the case of wideband transmission (of e.g., 500 Mbaud) than for narrowband transmission. Assigning a time slice number to a frame creates more time to decode a frame, just like in narrowband transmission. This considerably contributes to keeping the receiver design cost efficient. Summarizing, in time slicing the transmitted stream is cut in time slices. Each time slice carries, at each occurrence, exactly one physical layer frame (which is a frame of IQ symbols after encoding and modulating a baseband frame with one modulation and coding or modcod, see ETSI EN 302 307) and is categorized through a time slice number which is encoded in the physical layer header. Receivers select time slices of the aggregate physical carrier by decoding the physical layer header to detect the time slice number. Receivers subsequently only decode physical layer frames with one or more particular time slice numbers related to their satnet. Although time slicing is standardized in ETSI EN 302 307, the same concept of including a time slice number in the header of frame to inform receivers on a category the frame belongs to, applies to any block coded (where frames are used, per definition) transmission scheme. In other words, the approach presented in this invention goes beyond merely the ETSI EN 302 307 standard.

The transmitter device proposed in the present invention is arranged for multiplexing multiple satnets in one physical carrier of, for example, 500 Mbaud. Hence, contrary to prior art approaches, several satnets share here the same physical carrier. More specifically, each satnet gets a portion of the physical carrier. Each portion then corresponds to a virtual carrier symbol rate. For example, in case three equally large virtual carriers are sharing the same physical carrier, the virtual carrier symbol rate is upper bounded by one third of the physical carrier symbol rate.

The plurality of remote receiver terminals of the satellite communication system to which the transmitted signal conveys information data, may contain various types of terminals. For example, there may be terminals ('professional terminals') which are able to demodulate and decode consecutive frames at the physical carrier symbol rate, while other terminals can only handle a throughput lower than that physical carrier symbol rate and therefore require sufficient time between each frame with the same time slice number in order to be able to demodulate and decode them without packet loss. In general, every type of terminal can come with its own limitation in throughput.

Figure 3:
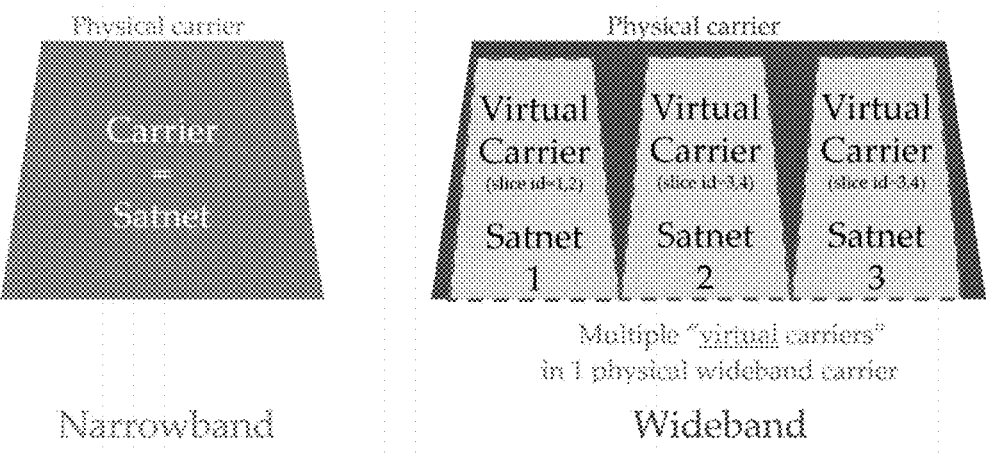
FIG. 3 illustrates the use of one virtual carrier per satnet and the multiplexing of multiple virtual carriers (and satnets) in one physical carrier.
Figure 4:
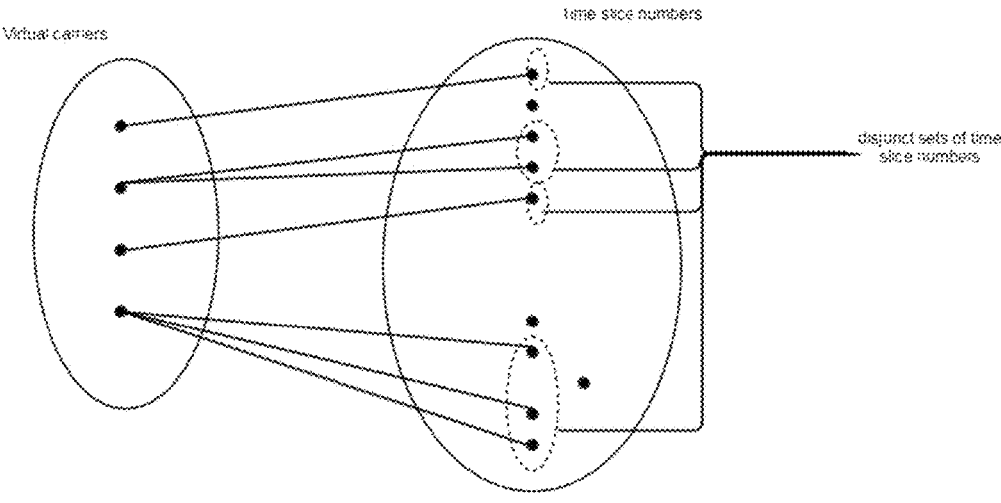
FIG. 4 illustrates the association of disjunct sets of time slice numbers per virtual carrier.

The following design is proposed in order to achieve a modular system implementation with reuse of existing blocks (which leads to the fastest, cost effective and most scalable implementation) and making abstraction of the modified physical layer, which now includes time slicing. Each satnet is treated independently and each satnet processor shapes the traffic of its satnet users to a certain symbol rate. This symbol rate, however, is not the physical carrier symbol rate but rather the symbol rate of a virtual carrier, denoted a virtual carrier symbol rate. A virtual carrier refers to the collection of time slices assigned to the corresponding satnet. FIG. 3 offers an illustration. Each virtual carrier is matched to a satellite network (satnet) and corresponds to one or more time slice numbers (but not all). A receiver knows which physical layer frame to demodulate and decode to retrieve the baseband frame, by first decoding the time slice number encoded in the header of each physical layer frame. If the time slice number decoded is comprised in the set of the time slice numbers associated to the satnet the receiver belongs to, it demodulates and decodes the physical layer frame, otherwise it discards the physical layer frame. Independent satnet processing before the modulation is performed per virtual carrier. E.g., two time slice numbers can be assigned to a satnet, such that the virtual carrier is a collection of the frames corresponding to those two time slice numbers. A time slice number can only be assigned to a single satnet, thus to a single virtual carrier. Hence, given a particular time slice number it is immediately known which satnet is considered. The virtual carriers each relate to a disjunct set of N time slice numbers. This is illustrated in FIG. 4. The number N of time slice numbers per virtual carrier is not necessarily the same for each virtual carrier. Suppose that, in time, those two slices occupy 20% of the transmitted baseband symbols. The virtual carrier symbol rate for that virtual carrier is then 20% of the aggregate physical carrier symbol rate. This concept of virtual carriers of course only works in the presence of specific bounds on the virtual carrier symbol rates in order to avoid packet loss, as discussed more in detail below. Those specific bounds, as well as the association of time slice numbers with groups of receivers, are applied by a central unit, which is steering the shaper-encapsulators. Whether the symbol rate shaped to is a virtual carrier symbol rate or a physical carrier symbol rate makes no difference for the shaper-encapsulator. Whether time slicing is used or not makes no difference. In other words, the existing off-the-shelf shaper-encapsulators can be reused.

Next, a mechanism is needed to multiplex the baseband frames from the multiple shaper-encapsulators. Indeed, for e.g., three virtual carriers in a physical carrier, three shaper-encapsulators burst baseband frames to a single modulator.

Hence, for all layers above the physical layer, it is as if the transmission occurs over multiple carriers. In other words, whether data is transmitted over multiple carriers or a single carrier is no more than a physical layer implementation detail. In upper layers the further processing is modular and done on satnet per satnet basis.

The satnet processors in the transmitter device, which comprise the shapers, i.e., the shaping and encapsulating means, are configurable. For example, a service provider can statically configure its network, e.g., by configuring the virtual carrier symbol rates for each satnet. In an embodiment the central unit can dynamically change the virtual carrier symbol rates within a physical carrier taking into account congestion, jitter and other important constraints in the network. To avoid buffer overflow, it is important to first lower the symbol rate of the virtual carriers that get smaller, after which the symbol rate of the virtual carriers that get bigger can be increased. In another embodiment, a functional block in or in connection with the transmitter device (e.g., a server external to the modulator or the modulator itself or the central unit) can dynamically change the virtual carrier symbol rate within a physical carrier taking into account the number of baseband frames buffered on the modulator or the number of dummy frames or fill frames (cfr. infra) inserted in the virtual carrier.

The shapers, which perform shaping and encapsulation and each correspond to a virtual carrier, send UDP or other type of packets to an Ethernet switch. Each packet contains one or more full baseband frames. The switch multiplexes the incoming packets on one output bit stream to the modulator. As a baseband frame is not spread over multiple packets, the output bit stream to the modulator contains a sequence of full baseband frames such that no reassembling on the modulator is needed. This saves resources and implementation time. In the modulator a time slice selector stores the baseband frames in storage means, e.g., in a RAM. The invention of course does not exclude other ways to bring baseband frames to the modulator, e.g., by allowing baseband frames to be cut in pieces requiring for a reassembling of frames on the modulator first or by receiving frames from the means for shaping-encapsulating over another interface than an Ethernet cable, such as a coaxial cables, subsequently storing the frames of all virtual carriers in the storage means.

The most important requirement for timesliced transmission to at least a group of receivers that cannot handle a throughput corresponding to the physical carrier rate but only a lower throughput, is to respect the respective specs in throughput from those receivers. For example, the receivers may not be able to decode more than 800 Mcbps (Mega coded bits per second). This holds for the set of time slices numbers decoded by that particular type of receivers. E.g., a receiver belonging to satellite network 3 decodes virtual carrier 3, which corresponds to slice numbers 5, 8 and 12. The instantaneous throughput of those slices cannot be larger than 800 Mcbps. Next, other receiver limitations may apply, e.g., a per slice throughput limitation due to limited buffer sizes or clock speeds in the time slice selector for example. As a consequence, the modulator must have full control on the time duration between the transmission of frames of the same slice, more specifically on the time interval between two frames with the same slice number. In addition, it is in general not desirable that two frames with different slice numbers but in the same virtual carrier, e.g., slices 5, 8 and 12 in the above example, be reordered in the receiver (e.g., reordering due to different processing time in the receiver for the two slices). Therefore, it may be useful to also impose a sufficient time duration between two frames of the same virtual carrier, even if they do not belong to the same slice number. Note that the constraints presented here result in a maximum frame rate. For example, when 64800 coded bits are conveyed per frame, the total coded throughput transmitted is frame rate*64800 coded bits per second. If not more than 800 Mcbps can be decoded, then the maximum frame rate that can be transmitted is 800 e6/64800=12345 frames per second.

On the other hand, having too much time between two frames of the same slice number or the same virtual carrier leads to an unnecessarily low allowed throughput for that slice or virtual carrier. In order to maximize satnet sizes this obviously is to be avoided as well. Thus, again, a modulator must have full control on the time interval between two frames of the same slice number or the same virtual carrier.

Figure 5:
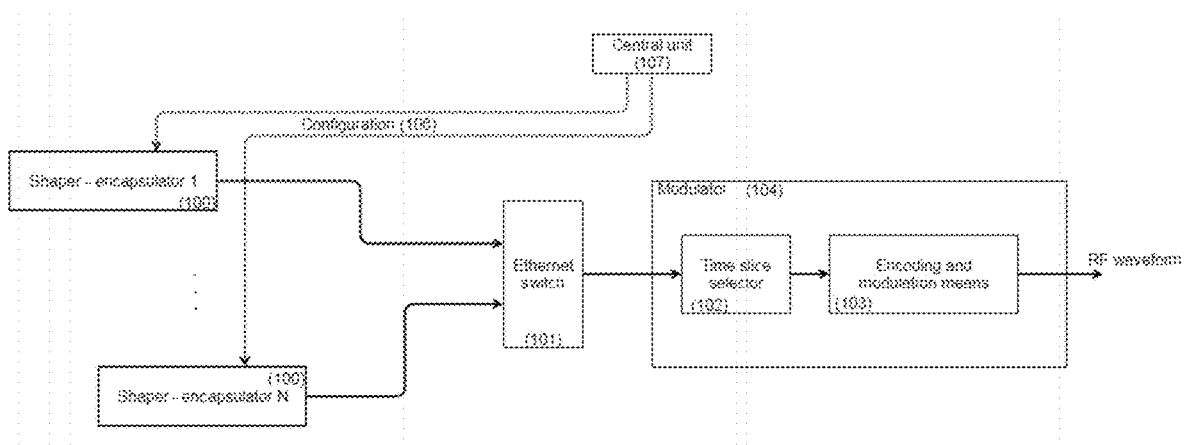
FIG. 5 illustrates a block scheme of an embodiment of a modulator of the earth station transmitter device according to the invention.

To achieve that, a time slice selector (102) at the input of the modulator (see FIG. 5) collects all frames from the different satnets. The incoming frames are referred to as virtual carrier baseband frames, i.e., baseband frames belonging to a particular virtual carrier. The time slice selector multiplexes the frames onto a single bit stream towards the modulation and encoding means (103) on a first come first serve basis, provided some time slicing related conditions are satisfied, which are detailed next. More specifically, at the input side from the time slice selector the received baseband frames are stored in storage means. At the output side of the time slice selector, after outputting a selected baseband frame to the encoding and modulation means (see Action 1 in FIG. 6), the time slice selector updates (Actions 2 and 3 in FIG. 6) a list of allowed time slice numbers and consequently (as virtual carriers are related to disjunct sets of time slice numbers) also a list of allowed virtual carriers (a virtual carrier is allowed if it is associated to at least one allowed time slice number). Then the oldest virtual carrier baseband frame in the memory that is from an allowed virtual carrier (Action 4-1-a in FIG. 6), is assigned an allowed time slice number (Action 4-1-b in FIG. 6) and output to the encoding and modulation means (Action 1 in FIG. 6). The baseband frames output by the time slice selector (the single output bit stream) are referred to as slice numbered baseband frames, i.e., baseband frames with a particular time slice number. The time slice selector can only put a time slice number on the list of allowed time slice numbers provided that the previous outputted frame with the same slice number (or from the same virtual carrier to avoid reordering, see above) was allowed sufficiently long ago, i.e., there must be a sufficient time interval between two frames of the same slice number (or same virtual carrier). In other words, as the transmission is continuous, there must have been sufficient symbols transmitted in between two frames of the same slice number (or same virtual carrier). If there is no single time slice number on the allowed list of time slice numbers, then "dummy data" will be output from the time slice selector on a 'dummy time slice number' not used for decoding by any of the receivers, as explained further. In a preferred embodiment the oldest virtual carrier baseband frame in the memory (i.e., which was stored longest ago) that is from an allowed virtual carrier (Action 4-1-a in FIG. 6) is selected. In another embodiment, a virtual carrier can be prioritized such that virtual carrier baseband frames from that virtual carrier are output first if available.

In case the list of allowed virtual carriers is not empty, but the allowed virtual carriers have no stored baseband frames, then, in one embodiment, 'fill frames' within an allowed virtual carrier are output from the time slice selector (i.e., multiplexed in the single stream of slice numbered baseband frames). Fill frames within a virtual carrier are tagged with a time slice number associated with the virtual carrier. Those fill frames are decoded by all receivers that decode that virtual carrier, but they are not decapsulated. So, fill frames are a sort of 'virtual carrier dummy frames' belonging to the virtual carrier itself, in contrast to the 'dummy frames' referred to above, associated to a dummy time slice number that is not associated to any virtual carrier. Moreover, a fill frame is modulated with a fill modulation (or modulated and encoded with a first fill modulation and coding), whereby said first fill modulation is selected from a set of fill modulations. In preferred embodiments that set comprises at least one fill modulation with a modulation order higher than QPSK. Dummy physical layer frames as referred to above, on the contrary, contain QPSK symbols and are not decoded. As explained in PCT/EP2022/082249, hereby incorporated by reference, fill frames can be added in the stream in various ways and the invention is not limited to any of those ways.

In the encoding and modulation means, the slice numbered baseband frames are not reordered anymore and, in a preferred embodiment, no new frames (e.g., dummy frames) are inserted anymore in between the slice number baseband frames. The latter is to avoid more time than needed between two frames of the same slice or virtual carrier. This limitation is different from state-of-the-art modulators. E.g., modulators implementing the DVB-S2(X) standard insert dummy PLFRAMES, see FIG. 1 in ETSI EN 302 307 and Sec. 5.5.1 in ETSI EN 302 307. The task of the dummy frame insertion there was to make sure that at each symbol time the transmit filter (referred to as BB filter in ETSI EN 302 307) had access to valid I/Q symbols in order to have a clean and stable spectrum and a constant power of the RF signal. In other words, when the FEC encoder did not yet finish the encoding of a BBF frame to a FEC frame (see ETSI EN 302 307), e.g., because there is not sufficient data to transmit, the PLFramer inserts a valid dummy frame such that the spectrum remains clean and the output power constant. As such, all receivers also remain in lock at the receiver side.

In a preferred embodiment, the insertion of dummy PLFRAIVIEs can be prevented in the proposed implementation because the time slice selector is part of the modulator itself, in the same clock domain, where it can receive a getFrame( ) command (i.e., a request) from the encoding and modulation means. The getFrame( ) command is the result of backpressure that starts in the baseband (BB) filter and goes back until the time slice selector. It makes sure not too much data is sent at once (and so avoids buffer overflow) but also that data is sent when needed such that the FEC encoder always has an available frame and no dummy frame insertion within the encoding and modulation means is needed. If no data baseband frames are available, the time slice selector itself can insert dummy frames (on a dummy slice number) or data frames with dummy data (so called fill frames), as such taking over the dummy insertion task of the PLFramer.

In another embodiment of the invention the encoding and modulation means do not send a request to the time slice selector. For example, in case sufficient buffering is present in the modulator, the time slice selector can output the baseband frames at a rate fast enough to avoid too much queuing in its storage means. As the sum of the virtual carrier symbol rates is typically slightly smaller than the physical carrier symbol rate, this rate should not overflow buffers in the encoding and modulation means. It can of course happen that a frame is not ready when the pulse-shaper needs it, such that the PLFramer inserts dummy frames from time to time. Such dummy frames do not cause a throughput violation in any receiver, as only the time duration between two data baseband frames is increased. It may only create a small additional throughput drop as such dummy frame may be the consequence of jitter in the modulator rather than being needed for the time sliced transmission. The same holds for the fill frames insertion. As explained in PCT/EP2022/082249, fill frames can be added in the stream in various ways and the invention is not limited to any of those ways.

The slice numbered baseband frames are modulated onto a RF waveform. The time slice selector sequentially selects baseband frames and time slice numbers for those frames which can then be modulated on the wide physical carrier. The oldest baseband frame (BBF) in the storage means of the time slice selector can be determined in multiple ways. One way is to use its baseband frame (BBF) sequence number. The baseband sequence number is attached to a frame at the moment the frame arrives in the modulator, before it is stored in the storage means (e.g., a RAM). The number just assigns a number to the frames in the order they have arrived at the modulator. It allows determining who arrived first. To handle the sequence number wrapping, the most significant bit (MSB) of the sequence number of the last transmitted BBF to the modulator core is stored. Before sequence number wrapping, the MSB is 1. As long as there are BBF sequence numbers with the same MSB value, these are older than sequence numbers starting from 0 again. The sequence numbers range from 0 to 32767, which is twice the total number of frames that can be stacked after each other in the memory. This avoids wrong detection of the oldest BBF in case of overflow conditions. The oldest virtual carrier baseband frame in the list of allowed virtual carriers is the virtual carrier baseband frame that has the lowest sequence number with the same MSB value as the last transmitted BBF to the modulator core.

Figure 7:
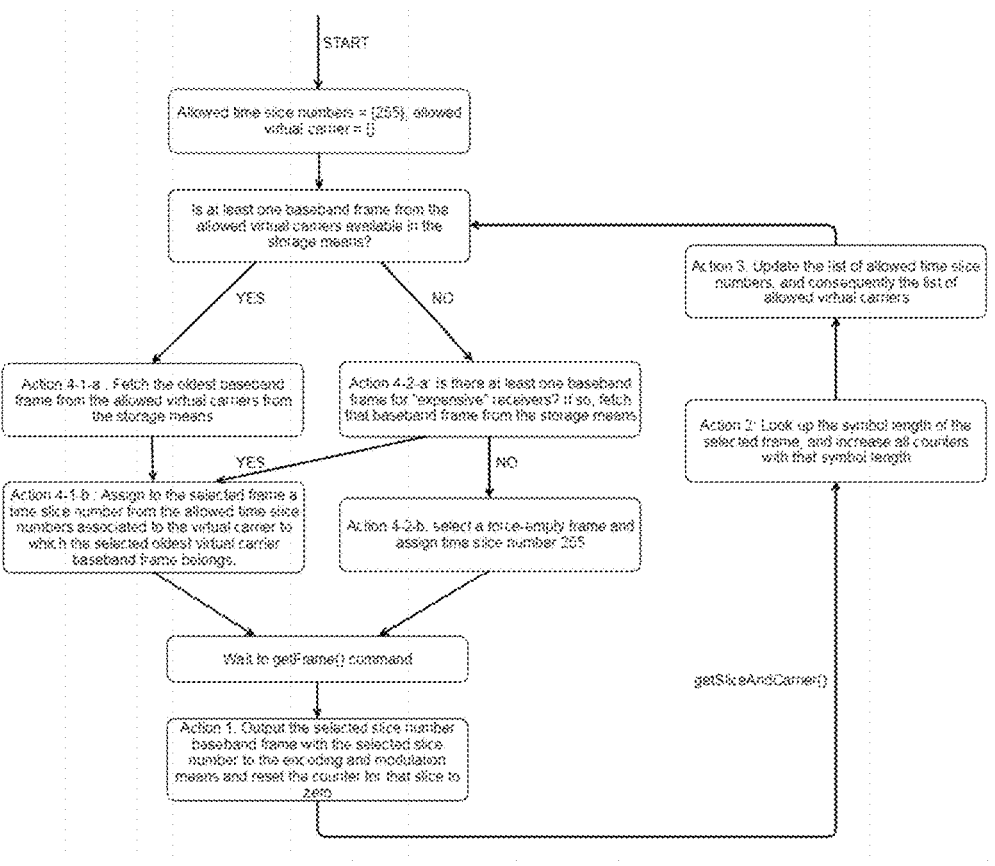
FIG. 7 illustrates a flowchart of another embodiment of the output side process of the time slice selector, selecting a virtual carrier baseband frame and corresponding time slice number as adopted in the present invention.

The selected slice numbered baseband frames are modulated as follows. Each slice numbered baseband frame is encoded by the modulator to a forward error corrected (FEC) frame (called coding), mapped to a physical layer frame of baseband symbols (called modulation), including a physical layer header (containing amongst others a start-of-frame sequence and an encoded time slice number) and data symbols, and finally pulse shaped to a baseband waveform. Hence, each baseband frame is associated to a modulation and coding (modcod). In DVB-S2 the number of coded bits of "normal" FEC frames equals 64800 bits. Thus, the number of bits in a baseband frame, before encoding, has a length that depends on the encoding rate, e.g., 2/3. Also, the number of data symbols in an encoded mapped baseband frame depends on the number of bits that are mapped to a single baseband symbol (e.g., 2 bits for QPSK, 3 bits for 8-PSK, 4 bits for 16-APSK constellations, etc). The baseband waveform is finally upconverted onto a carrier frequency by an IQ modulator. Before performing the pulse shaping, the gateway transmitter typically registers the actual value of a reference clock in the modulator at the time instant the Start Of Frame (SOF) symbol gets pulse-shaped (see for example ETSI EN 302 307: "Digital Video Broadcasting (DVB); Second generation framing structure, channel coding and modulation systems for Broadcasting, Interactive Services, News Gathering and other broadband satellite applications", annex G.5). This value is then inserted in a placeholder for the network clock reference (NCR) of a subsequent frame before encoding (see for example FIG. 7 in Sec. 6.1 of ETSI EN 301 790 V1.5.1 (2009-05), "Digital Video Broadcasting (DVB); Interaction channel for satellite distribution systems"), such that all terminals can slave to this common value, which allows them to synchronize their return link transmissions. As mentioned before, the present invention is not limited to ETSI EN 302 307 or DVB-S2(X). Any framed communication system may apply the approach disclosed in this document.

The virtual carrier baseband frames are buffered in storage means in the modulator, for example on a field programmable gate array (FPGA) or an application-specific integrated circuit (ASIC or chip). One way is to have storage means per virtual carrier. Another way is to keep track of the pointers to the baseband frames of a virtual carrier while storing all baseband frames in a global memory. The person skilled in the art can understand that there are other ways to store and again retrieve the frames of multiple virtual carriers.

The time slice selector can run on a processor or in the FPGA. To update the list of allowed time slice numbers (Action 3 in FIG. 6), the time slice selector maintains (Action 2 in FIG. 6) a counter per slice number (or in addition a per virtual carrier counter in case more than one slice number is used per virtual carrier and in the presence of a limitation on the time duration between two frames of a different slice number but the same virtual carrier) indicating the amount of symbols transmitted as of and including the last frame of that slice number (or virtual carrier) was released in the single bit stream. Hence, when a slice number from the list of allowable slices is chosen for a selected virtual carrier baseband frame, the counter for that slice number is reset to the corresponding length of the selected virtual carrier baseband frame (or, equivalently, reset to zero, after which all counters are increased with the corresponding length of the selected virtual carrier baseband frame). Once the counter exceeds a per slice number programmable limit, the slice number enters the list of allowed slice numbers. The list of allowed virtual carriers is updated with all virtual carriers having at least one allowed time slice number. The oldest virtual carrier baseband frame from a virtual carrier in that list is then the next frame to be released on the single bit stream (Action 4-1-a in FIG. 6). An allowed time slice number associated to the virtual carrier baseband frame is assigned to the selected frame (Action 4-1-b in FIG. 6). In case no frame is present in the list of allowed slice numbers, a non-limited frame (e.g., a dummy frame associated to a dummy slice number, or a frame destined to a group of receivers without limiting throughput constraints) is transmitted in one embodiment. In another embodiment, this is refined as follows. In case there is no allowed slice number, a non-limited frame is transmitted. In case there are allowed slice numbers but there is no frame in the storage associated to the allowed slice numbers, then a fill frame is inserted.

The per slice programmable limit used as a basis for allowance to the list of allowed slice numbers is an indication of the throughput limits present in at least one receiver that must decode frames with those slice numbers. Such throughput limits are presented and discussed further in this description. Those programmable limits, an indication of said throughput limits, can be conveyed to the time slice selector by the central unit or by any entity aware of the throughput limit of the slice numbers. In another embodiment this programmable limit is constant, e.g., in case it is known that all receivers at least achieve a minimum particular throughput.

The transmission of the non-limited frame may be implemented in multiple ways. E.g., the time slice selector may output a baseband frame that corresponds to a non-limited frame to the encoding and modulation means. In another implementation, the time slice selector does not output baseband frames corresponding to non-limited frames itself, but it may output one or more state bit to the encoding and modulation means indicating the number and type of non-limited frames that must be inserted by the encoding and modulation means.

In another embodiment the list of allowed virtual carriers not only comprises all virtual carriers having at least one allowed time slice number, but for example always comprises a virtual carrier that is decoded by receivers that are arranged for demodulating and decoding at the physical carrier symbol rate.

In one embodiment (see FIG. 7) non-limited frames may be frames that can be demodulated and decoded by decoders which are able to demodulate and decode consecutive frames at the physical carrier symbol rate. Assume, for example, a physical carrier subdivided in three virtual carriers. The first and the second virtual carrier are for satnets with receivers that can only deal with a throughput lower than the physical carrier symbol rate. The third virtual carrier, with its dedicated shaper-encapsulator, can be decoded by a receiver capable of operating at the physical carrier symbol rate (an "expensive receiver", so to say). If no allowable slice number(s) for the receivers for the first and second virtual carrier is/are found or if no baseband frames for those receivers are available, available baseband frames for the receivers for the third virtual carrier can be transmitted (Action 4-2-a in FIG. 7). Then the oldest stored baseband frame from the third virtual carrier is selected or, in another embodiment, priorities can be taken into account instead of simply selecting the oldest one, as explained before. Those third virtual carrier baseband frames still get assigned a time slice number (Action 4-1-b in FIG. 7) as it is not allowed to mix transmissions with and without time slicing. This is because all receivers need to maintain lock on the continuous carrier, such that the format of the header (which is different with and without time slicing) must kept constant. In a preferred embodiment an implementation (see FIG. 6) is simply to set the programmable limit for the time slice numbers decoded by the receivers that can handle the physical carrier symbol rate to zero or another sufficiently low value, so that those time slice numbers are always on the candidate list of time slice numbers and thus always allowed for transmission. When no data baseband frames are available or allowed to be transmitted, the time slice selector selects a force-empty frame. A force-empty frame is a slice that will be rejected by all receivers and that is forced in the carrier by the modulator, such that the modulator is sure about the time between slices. For example, there are 256 possible slice numbers, from 0 to 255. The force-empty frames can then e.g., be associated to slice 255 (Action 4-2 in FIG. 6), while the communication system only allows terminals to be associated with slice numbers 0 to 254. Obviously, any other slice number can be chosen for the force-empty frames as long as a terminal cannot be associated with that slice number.

Figure 6:
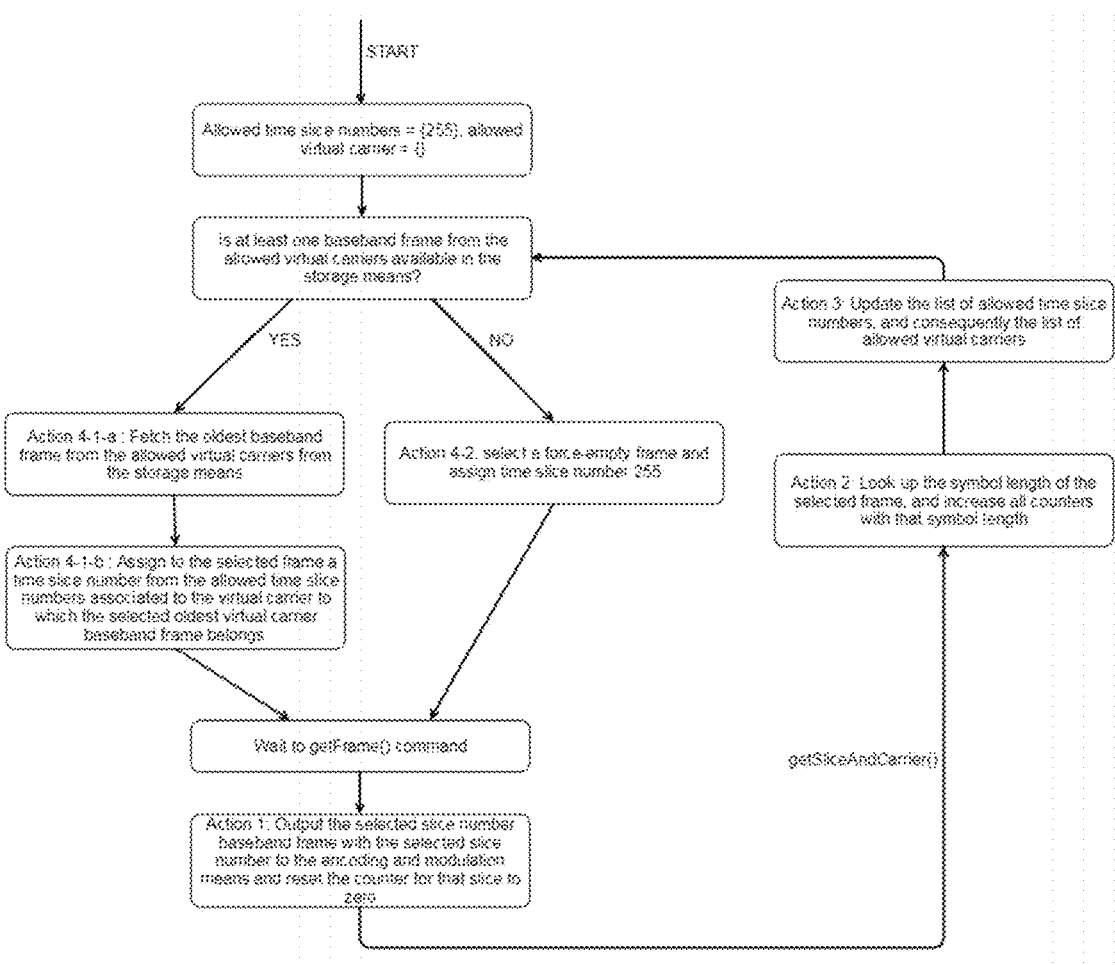
FIG. 6 illustrates a flowchart of a preferred embodiment of the output side process of the time slice selector, selecting a virtual carrier baseband frame and corresponding time slice number as adopted in the present invention.

The flow of the time slice selector in the modulator is clarified in FIG. 6 and can be summarized as follows. On the one hand, it receives at its input virtual carrier baseband frames which are assigned a BBF sequence number and consequently stored in the storage means. On the other hand, the time slice selector receives a getFrame( ) command from the encoding and modulation means (see FIG. 6 above Action 1). Upon that command, it outputs the selected baseband frame with slice number to the modulation and encoding means (Action 1 in FIG. 6). Then it requests a getSliceAndCarrier( ) to update (Action 3 in FIG. 6) the list of allowed time slice numbers and thus virtual carriers and determines the oldest allowed virtual carrier baseband frame (Action 4-1-a in FIG. 6) to obtain a time slice number (Action 4-1-b in FIG. 6) and a virtual carrier baseband frame to be outputted to the encoding and modulation means next (Action 1 in FIG. 6). At start-up, the default time slice number is that of the force-empty frame, e.g., slice number 255. Upon reception of a getSliceAndCarrier( ) the slice selector knows when said next frame will be sent (because it knows the time duration of the previous outputted frame from the slice selector) and it chooses the oldest frame in storage means for the allowed virtual carriers. If no virtual carrier baseband frame is available in the storage means, a force-empty baseband frame is sent (Action 4-2 in FIG. 6). The symbol length of the chosen frame, which depends on the modcod of that frame, is looked up (Action 2 in FIG. 6). The counters for each of the time slice numbers are incremented with that symbol length and the list of candidate time slice numbers and consequently the list of candidate virtual carriers are updated.

Force-empty frames of course occupy symbols in the aggregate physical carrier. However, those symbols are not assigned to a virtual carrier as those frames do not result from a satnet processor or are not directed to any receiver. As a result, the sum of the virtual carrier symbol rates must be lower than the symbol rate of the physical carrier. Hence, there is an inherent inefficiency related to time slicing, which can be very small however. For example, the aggregate physical carrier size (physical symbol rate) should exceed 100.2% of the sum of the virtual symbol rates present in that carrier. In case of three virtual carriers (VCs) of 140 Mbaud, the aggregate symbol rate must be greater than or equal to 420.84 Mbaud.

The type of force-empty frames to be sent is very important. Force-empty frames must be valid frames, which allow the receivers to maintain lock, even if hundreds of force-empty frames are sent consecutively. Hence, in the case of DVB-S2X, a force-empty frame should use an official modulation and coding (modcod), e.g., for ETSI EN 302 307, with normal or short FEC codes and with pilots on or off mode. Since receivers are sometimes made by other vendors than transmitters, standardized transmission is often used, e.g., DVB-S2X. Hence, the modcod of the force-empty frames should be one of the official modcods as published in DVB-S2X. Still, many modcods can be chosen and it is important to pick the right modcod for the force-empty frames in order to have the best performance. Hardware measurements yield an optimal data frame error rate performance if standardized frames with a header and pilot symbols on are used as force-empty frames and when the modulation order is not too high. As a consequence, the extreme example of 256APSK frames without pilot symbols is not an ideal type of force-empty frames. When such frames are sent, certain receivers may have difficulties to maintain the synchronization in an optimal way. In general, force-empty frames that use 256APSK, 128APSK or 64APSK modcods are to be avoided for many receivers. Also, the use of a "pilots off" mode (see Sec. 5.5.3 in ETSI EN 301 790 V1.5.1 (2009-05)) in force empty frames is better avoided. Similarly, it is to be avoided to use short frames as force-empty frames. Adopting these recommendations leads to the best synchronization and more correct $*E_s/N_0$ monitoring in receivers that can only process a lower throughput than the physical symbol rate.

In order to fix the type of force-empty frames, one must first understand its impact on the satellite network (satnet) sizes and more specifically, on the virtual carrier symbol rate limits. Suppose the maximum coded throughput at the receiver side, per slice, is 258 Mcbps (Mega coded bits per second). At first, it may appear that the satnet size would then be such that the coded throughput in the satnet is at most 258 Mcbps assuming that a virtual carrier only is associated to one slice number. However, due to tiling loss (illustrated below), the coded throughput limit per satnet is in practice lower. As mentioned before, force-empty frames of course occupy symbols in the aggregate physical carrier which already caused the sum of the virtual carrier symbol rates to be strictly smaller than the aggregate physical carrier symbol rate. In addition, force-empty frames cause tiling loss, as now explained by means of an example. Suppose the maximum coded throughput at the receiver side, per slice, is 258 Mcbps, which will serve as running example in this description. This limit is denoted Lim1=258 Mcpbs. Clearly, this throughput limit Lim1 at the receiver side depends on the actual receiver, type of chip, supplier etc. Any other receiver side limitation can simply lead to a new limit Lim1. A numerical example is provided below for DVB-S2X, but the invention is obviously not limited thereto. Given that a coded frame consists of 64800 bits, at least 251.16 µs must pass in this running example before sending a new frame of 64800 bits, as 64800/258 µs=251.16 µs. Hence, in the running example the minimum guard time between two consecutive coded frames of the same slice is 251.16 µs. The worst-case tiling loss is that a force-empty frame is sent just before the guard time has finished. In that case the actual guard time between two consecutive frames is thus 251.16 µs increased with the duration of a force-empty frame transmission. The tiling loss can be captured by a force-empty efficiency variable, which equals the ratio of the minimum guard time to the actual worst-case guard time (being the sum of guard time and the tiling duration). In the case of two slices per virtual carrier, the guard time of both slices is increased with the tiling duration. Consider, merely for the sake of the example, the following two force-empty modcods in the case of DVB-S2X:

32APSK 5/6 short frames pilots on, which occupy 3492 symbols, or, at x Mbaud, 3492/xµs, e.g., 11.64 µs at 300 Mbaud.

QPSK 1/4 normal frames pilots on, which occupy 33372 symbol, or, at x Mbaud, 33372/xµs, e.g., 111.24 µs at 300 Mbaud.

As already mentioned, short frames are not ideal as force empty frames to maintain synchronization and for $E_s/N_0$ monitoring, but it is still useful to look at this example as it provides insight on the impact of tiling on virtual carrier symbol rate limits and throughput loss. Clearly, the tiling duration of the QPSK normal frame is 10 times longer than that of the 32APSK short frame. Assuming the 32APSK 5/6 short force-empty frame, the worst-case force-empty efficiency is (with x denoting the baud rate)

$$FE\text{-}Eff\_lower=251.16/(251.16+3492/x)$$

which is a lower bound (as it assumes a force-empty frame is sent just before the guard time is finished, which is almost never the case) to the actually observed force-empty efficiency. For any Lim1 throughput limit, any tiling duration T in number of symbols and any FEC coded length size F (here 64800), this becomes $$FE\text{-}Eff\_lower=F/\text{Lim}1/(F/\text{Lim}1+T/x)$$

Even more in general, in case other throughput limitations exist at the receiver side, i.e., not only Lim1, but also Lim2, Lim3, etc., and denoting Lim=min(Lim1, Lim2, Lim3, . . . ), this becomes $$FE\text{-}Eff\_lower=F/\text{Lim}/(F/\text{Lim}+T/x).$$

Figure 8:
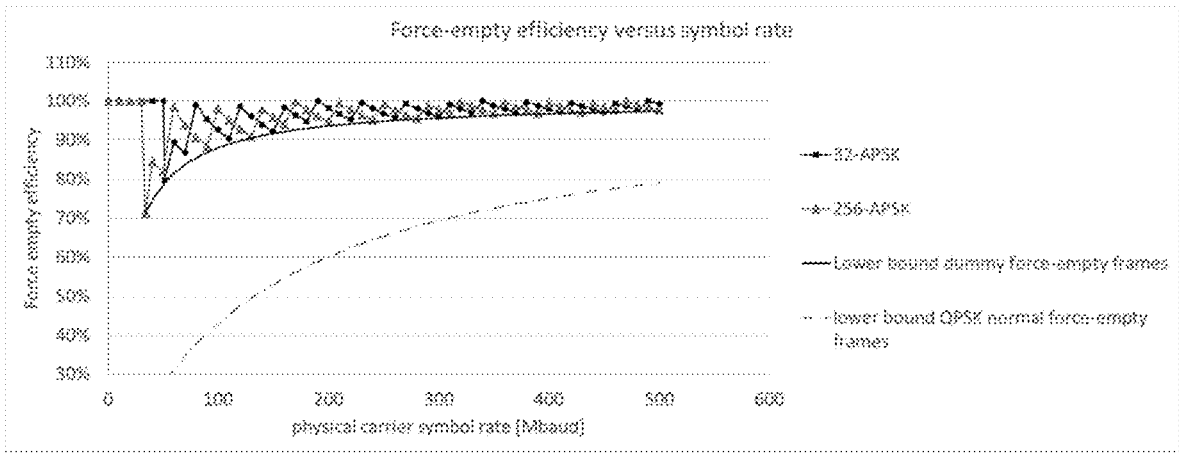
FIG. 8 illustrates the force-empty efficiency vs the physical carrier symbol rate.

This lower bound for 32APSK short as well as for QPSK normal force-empty frames, is shown in FIG. 8 for the running example.

To grasp this better, consider the following example, with one virtual carrier, with 1 or 2 slices:

carrier size=300 Mbaud the virtual carrier is shaped to a virtual carrier symbol rate of v Mbaud the virtual data carrier transmits a fixed modcod for the payload: 32APSK 5/6 pilots on, normal frames.

Summarizing, data frames in the example are 32APSK normal frames and force-empty frames are 32APSK short or QPSK normal frames. The question is what the maximum virtual carrier symbol rate v is so that all slices can be transmitted at a throughput lower than the receiver throughput limitation Lim, e.g., 258 Mcbps.

The skilled person can retrieve the numbers provided in the following example by applying ETSI EN 302 307: "Digital Video Broadcasting (DVB); Second generation framing structure, channel coding and modulation systems for Broadcasting, Interactive Services, News Gathering and other broadband satellite applications", annex M) and also in DVB-S2X (Digital Video Broadcasting (DVB), DVB Document A83-2, Second generation framing structure, channel coding and modulation systems for Broadcasting. Interactive Services. News Gathering and other Broadband satellite application, Part II: S2-Extensions (DVB-S2X), March 2014). The number of symbols in a 32APSK normal frame with pilots on equals 13428 symbols. Two normal data frames (in the case of two slices per virtual carrier) of each 13428 symbols (including header and pilots) at 300 Mbaud are transmitted in 89.52 μs. As a consequence, after transmission of two data frames, forced empty frames must be transmitted until at least 251.16 μs have passed. Thus, fourteen force-empty 32APSK short or two QPSK normal frames have to be sent, which results in a tiling loss of 1.32 μs or 60.48 μs, respectively. In this case the force-empty efficiency is 251.16/(251.16+1.32)=99.48% and 251.16/(251.16+60.48)=80.5%, for 32APSK 5/6 short force-empty frames and QPSK 1/4 normal force-empty frames, respectively.

Without tiling loss the achievable coded throughput would be equal to Lim=258 Mcbps for the considered example. However, due to the tiling loss this decreases by the force-empty efficiency. From the reduced coded throughput the maximum achievable shaped virtual carrier symbol rate can be computed. In this case (transmitting 5 coded bits per symbol for 32APSK data frames)

v=258*99.48%/5*2=51.33*2=102.66 Mbaud when transmitting 32APSK 5/6 force-empty frames v=258*80.5%/5*2=41.5*2=83 Mbaud when transmitting QPSK 1/4 force-empty frames Clearly, it is of interest to have the highest possible virtual carrier symbol rates as it determines how many terminals can be grouped in one satnet and thus how many satnets are needed. The number of satnets directly translates to capital expenditures, as it requires satnet processors, multi-carrier demodulators for the return link (typically one per satnet), etc.

In order to propose clear virtual carrier symbol rate limitations, two modes of operation have to be distinguished: the physical carrier symbol rate limited mode and the slice limited mode. In the physical carrier symbol rate limited mode the physical carrier symbol rate is sufficiently low, such that sending data frames consecutively does not lead to a throughput violation at the receiver side; hence, no force-empty frames must be sent if sufficient traffic is present (if not sufficient traffic is present, force-empty frames are sent, but as there is less traffic, this does not lead to buffer overflows). Clearly, all virtual carrier symbol rate limits can then simply be derived directly from the throughput limitation at the receiver side, e.g., 258 Mcbps. The force-empty efficiency is then 100%, resulting in a maximum physical carrier symbol rate of v=258*100%/5=51.33 Mbaud per slice. The maximum carrier baud rate for which the baud rate limited mode is active for 32APSK data frames, is $$BR\text{max}=258/5*Nr \text{ of Total slices per virtual carrier,}$$

or, for two slices per virtual carrier, BRmax equals 103.2 Mbaud.

In general, for data frames with a constellation having/ coded bits per symbol and provided that the maximum coded throughput of the receiver is Lim, the maximum physical carrier symbol rate in case there is only one virtual carrier that fully occupies the carrier, is $$BR\text{max}=\text{Lim}/1*Nr \text{ of Total slices per virtual carrier}$$

e.g., 102 Mbaud for 32APSK data frames, Lim=254 Mcbps. Assuming Lim=254 Mcbps and extending the table to other codes and modulations, one gets a) 127 Mbaud when the highest modcod is a 16APSK (I=4) modcod b) 102 Mbaud when the highest modcod is a 32APSK (I=5) modcod c) 85 Mbaud when the highest modcod is a 64APSK (I=6) modcod in case only one virtual carrier is sent in the aggregate physical carrier and that virtual carrier contains two slices. The highest modcod refers to the most efficient coding and modulation. Clearly, in case some margin is taken, the maximum symbol rates simply change accordingly. In another embodiment of the invention, the virtual carrier symbol rate limits are constant, regardless of the most efficient coding and modulation used in the particular satellite network. In that case one can for example limit all satnets to 85 Mbaud, even if the highest modcod is 16APSK. This simplifies the configuration and modulator implementation, but however leads to smaller satnets which provides less opportunity for satellite multiplexing gains (as explained further in this description).

Sometimes, there is an additional limitation in star networks wherein also a clock reference and other useful data is sent. More specifically, demodulators sometimes have a queue for each time slice number. The queue contains the baseband frames belonging to that time slice number, but for multiple reasons (e.g., maintenance of lock, NCR clock recovery, monitoring, . . . ) the queue can also contain for baseband frames not belonging to the time slice number, information that also fills the queue. Since QPSK has the longest frame length, two QPSK baseband frames plus the other information for the frames in between can overflow those queues. By limiting the symbol rate this can be avoided. Such a symbol rate limit can for example be 144 Mbaud when the highest modcod is a QPSK (I=2) or 8PSK (I=3) modcod.

Above, the physical carrier symbol rate limits have been proposed to remain within the physical carrier symbol rate limited zone. Obviously, in certain cases the physical carrier rate can be outside that zone, e.g., in the case of transmitting 32APSK data frames with a physical carrier symbol rate greater than 102 Mbaud. In that case the virtual carrier rate has to be strictly smaller than 102 Mbaud as shown below. In order to fill a carrier with a greater physical carrier symbol rate, e.g., 450 Mbaud, more than one virtual carrier can be multiplexed in the same physical carrier. It is now explained what happens in the slice limited mode. In case there is more than one virtual carrier per physical carrier, the physical carrier symbol rate can be assumed higher than the limit for the physical carrier rate limited zone. Indeed, it is of interest for statistical multiplexing to have satnets as large as possible. The only reason for making virtual carriers smaller than the physical carrier through time slicing is because of throughput limitations at the receiver end. Hence, the slice limited mode is assumed to be active. The force-empty efficiency is thus lower than 100% due to tiling loss, as illustrated above.

Consider again the example of the decoder throughput limitation of Lim=258 Mcbps, i.e., the achievable symbol rate of the virtual carrier is lower than Lim/1*Nr of total slices per virtual carrier, or lower than 103.2 Mbaud for 32APSK frames, more specifically 103.2*force-Empty efficiency. The force-empty efficiency is worse just above the physical carrier symbol rate limit, because the time duration of a forced empty frame is larger for lower baud rates. For example, at 103.21 Mbaud, the worst-case force-empty efficiency is 88.13% (43.72%) when sending 32APSK 5/6 (QPSK 1/4) force-empty frames.

The lowest force-empty efficiency can be found by considering the full force-empty duration as tiling loss at the lowest possible physical carrier symbol rate where force-empty frames have to be sent to prevent throughput violations. If only one slice is adopted, the physical carrier symbol rate is lower than 51.33 Mbaud, the 258 Mcbps limitation is never violated and force-empty frames are never sent. Hence, the longest possible force-empty duration is just above 51.33 Mbaud; e.g., for 51.34 Mbaud, in the absence of other virtual carriers (i.e., there is only one virtual carrier or the other virtual carriers have no traffic), the force-empty efficiency is 78.69% (27.87%) when sending 32APSK 5/6 (QPSK 1/4) force-empty frames.

Summarizing, given the impact of "long" forced empty frames on the force-empty efficiency and the inferior lock behaviour of high order constellations, it is clearly preferable to choose short type of frames for the force-empty frames.

From the above, the shortest force-empty frame with a low modulation and coding is found most appropriate. Therefore, it is logical to use normal dummy frames (see ETSI EN 302 307-1: "Digital Video Broadcasting (DVB); Second generation framing structure, channel coding and modulation systems for Broadcasting, Interactive Services, News Gathering and other broadband satellite applications; Part I (DVB-S2)", Sec 5.5.1) as force-empty frames in the case of using DVB-S2X. Dummy frames are frames where the payload symbols all consist of I=1/sqrt(2) and Q=1/sqrt (2). In DVB those are of course still scrambled by the DVB-S2(X) physical layer scrambling.

Some implementations from the demodulator include signalling per received frame to the output of the demodulator, for NCR recovery and for statistics monitoring. This may yield problems at high symbol rates and when using short frames, as a lot of signalling per second is output from the demodulator. In a particular demodulator implementation, overflow on the signalling bus can occur as of 380 Mbaud, when using dummy frames. Hence, in the case of using DVB-S2X, another force-empty frame than dummy frames is needed above 380 Mbaud. Short frames in DVB-S2X are not ideal for synchronization and $E_s/N_0$ monitoring. To have short DVB-S2X "normal frames", a higher order modulation and coding is employed. However, 64APSK and higher also leads to synchronization problems and $E_s/N_0$ monitoring. The modulation and coding 32APSK is borderline and only 20% shorter than 16APSK normal frames. As a result, most preferred is to take 16APSK normal force-empty frames. Note that the invention also allows 32APSK or 8PSK normal frames to be used.

In summary, it is proposed to adopt dummy force-empty frames below a particular physical carrier symbol rate 16-APSK force empty normal frames above that particular physical carrier symbol rate That particular physical carrier symbol rate is around 380 Mbaud for a particular receiver, but any other receiver may require another particular symbol rate.

Below 380 Mbaud (force empty duration is 3420 symbols), the worst-case force-empty efficiency (just above the physical carrier symbol rate limits provided above) is 86.4%, 88%, 90% for 64APSK (for physical carrier symbol rate 85.1 Mbaud), 32APSK (for physical carrier symbol rate 102.1 Mbaud) and 16APSK (for physical carrier symbol rate 127 Mbaud), respectively. Above 380 Mbaud (16APSK force-empty frame duration is 16776 symbols) the worst-case force-empty efficiency (at the physical carrier symbol rate of 380 Mbaud) for 32APSK data frames is 85.25%. The worst-case force-empty efficiency of other modcods is not lower for other type of data frames than those above for dummy frames.

Above the worst-case, force-empty efficiencies have been derived in the slice limited zone without considering the impact that virtual carriers may have on each other. However, virtual carriers also have an impact on each other, which further limits the satnet sizes. The following example is considered to make this clear. Two virtual carriers (VCs), with one slice each, with 32APSK data frames can be transmitted each with virtual carrier symbol rate of 51 Mbaud in a physical carrier of 102 Mbaud. No force-empty frames are sent.

However, this is not the case when one of the virtual carriers has 32APSK data frames and the other virtual carrier has QPSK data frames (e.g. because of a cloud in between the satellite and the receivers of that other virtual carrier, limiting the signal-to-noise ratio and thus the achievable modulation and coding). More specifically, assume VC1 has QPSK frames and VC2 32APSK frames. From the above, the maximum virtual carrier symbol rate is known to be 258/5=51.6 Mbaud for 32APSK and 258/2=129 Mbaud for QPSK. Suppose the overall physical carrier symbol rate is 100 Mbaud and both VC1 and VC2 are shaped to 50

Mbaud. Suppose the 32APSK frames arrived first through the Ethernet interface at the modulator (thus are the "oldest" frames) and then the QPSK frames arrive over the same Ethernet interface. Suppose that the shaper-encapsulator bursts every 10 ms all frames to be sent in those 10 ms to the modulator, at a very high speed, after which the time slice selector stores those frames and releases them to the modulation and coding means at the speed of the achieved virtual carrier symbol rate. In this case, for each virtual carrier, the modulator gets bits from the respective shaper-encapsulators corresponding to 500000 symbols (such that 50e6 symbols are transmitted every second). The slice selector alternates between the QPSK and 32APSK frames because it cannot send two consecutive 32APSK frames. Since a QPSK frame is 2.48 times longer than a 32APSK frame, this means the QPSK frame gets, during a time period of t1 seconds, an average symbol or baud rate of ABRVC1([0–t1])=71.3 Mbaud and the 32APSK frames gets ABRVC2([0–t1])=28.7 Mbaud. Consequently, after t1=10/(71.3/50)=7.01 ms, the QPSK frames are all sent (as the shaper-encapsulator of VC1 was shaped to 50 Mbaud, yielding 500000 symbols, which are all output from the slice selector after 7.01 ms), but only 28.7/50*7.1/10=40.75% of all 32APSK frames have been sent. After t1 seconds the slice selector must send force-Empty frames in between the 32APSK data frames in order to guarantee that the coded throughput of the 32APSK frames does not exceed 258 Mcbps. Worst case, the force-empty efficiency at 100 Mbaud is 88% with dummy force-empty frames, yielding an achievable virtual carrier symbol rate of 45.45 Mbaud. Hence, after 10 ms, only 40.75+49/50*2.9/10=69.17%, of the 32APSK frames have been sent. Consequently, a shaped baud rate of 50 Mbaud for both virtual carriers is not achievable, while it was achievable for two VCs with 32APSK data frames.

This observation gets less bad with more than two virtual carriers, as illustrated next. Consider for example three virtual carriers of each 50 Mbaud in a 150 Mbaud carrier with two possible combinations of data frames for VC1, VC2 and VC3, respectively: QPSK1, QPSK2, 32APSK, or QPSK, 32APSK1, 32APSK2. In the first configuration the slice selector first alternates 32APSK and QPSK1 frames until the QPSK frames are transmitted (at 71.3% of 150 Mbaud or 106.96 Mbaud), i.e., after 10/(106.96/50)=4.67 ms. Then, the slice selector alternates 32APSK and QPSK2 frames during another 4.67 ms. Now, 9.35 ms have passed. Until then, the 32-APSK frames have been sent at 150-106.96=43.04 Mbaud, such that 43.04/50*9.35/10=80.47% of the frames have been sent, which is already more than the 69.17% of frames sent with two virtual carriers. In the last 0.65 ms 53.18 Mbaud can be transmitted of 32-APSK frames, so that in total 80.47+53.18/50*0.65/10=87.4% of the 32APSK frames have been sent. In the second configuration, QPSK, 32APSK-1, 32APSK2, the slice selector alternates 32APSK1, 32APSK2, QPSK frames; hence, QPSK frames get 2.48/4.48 of 150 Mbaud, or 55.4% of 150 Mbaud=83.1 Mbaud, while 32APSK frames get 150-83.1/2=33.45 Mbaud. The QPSK frames are all transmitted after 50/83.1*10 ms=6.02 ms. Then, the slice selector alternates 32APSK1, 32APSK2 frames at a worst-case force-empty efficiency of 91.68% or 47.3 Mbaud, during 3.98 ms. In total, the achieved symbol rate or VC1 and VC2=6.02/10*33.45+3.98/10*47.3=38.95 Mbaud or 77.8% of the total frames to be sent, also better than the 69.17% of the frames transmitted in the case of two virtual carriers. From to the above numerical examples the person skilled in the art understands the worst case is that of two virtual carriers where the third virtual carrier only consists of two QPSK frames. The mechanism in the presented example is two-fold:

the actual instantaneously achieved virtual carrier symbol rate of virtual carriers is higher for lower modulation orders Due to the unequal instantaneously achieved virtual carrier symbol rates, the lower modulation orders are more quickly transmitted, after which the higher order modulation order suddenly are transmitted at a larger rate (e.g., the full physical carrier symbol rate when there are only two virtual carriers) which is typically outside of the physical carrier symbol rate limited zone.

With two slices per virtual carrier, the situation becomes less severe, as the slice selector will alternate 32APSK slice 1, 32APSK slice 2 and QPSK frames. Furthermore, the physical carrier symbol rate is higher as of which the force-empty efficiency is better, typically above 95%. Repeating the above example for two virtual carriers where the other virtual carrier has QPSK frames, the person skilled in the art can easily verify from the above that the force-empty efficiency for 32APSK and 64APSK data frames is roughly 90% and 83%. Hence, the virtual carrier symbol rate that can be achieved by satnets with 32APSK data frames or 64APSK data frames can be at most roughly 90% and 83% of BRmax, respectively.

Taking into account the reduction in virtual carrier symbol rates in the case of multiple virtual carriers, the following table is obtained:

a) 114 Mbaud when the highest modcod is a 16APSK (I=4) modcod b) 90 Mbaud when the highest modcod is a 32APSK (I=5) modcod c) 69 Mbaud when the highest modcod is a 64APSK (I=6) modcod At physical carrier symbol rates higher than 380 Mbaud, the force-empty frames become 16APSK force empty frames. However, many more VCs are used to fill the physical carrier of 380 Mbaud, with less stringent consequences due to unequal instantaneous symbol rates. Numerical simulations show that only the virtual carrier symbol rate for 32APSK modcods has to be reduced above 380 Mbaud, more specifically to 80 Mbaud.

The description above allows implementing an earth station transmitter device and satellite communication system comprising such an earth station transmitter device that forms a modular, simple and cost-efficient extension of prior art solutions so that they become able of applying time slicing. In addition, the implementation allows for a dynamic configuration of the virtual carrier symbol rates by the central unit. As mentioned before, in a more advanced embodiment the central unit can dynamically change the virtual carrier symbol rates within a physical carrier taking into account congestion, jitter and other important constraints in the network. To avoid buffer overflow in the modulator, it is important to first lower the symbol rate of the virtual carriers that get smaller, after which the symbol rate of the virtual carriers that get bigger can be increased. This is referred to as dynamic load balancing, or, dynamically varying the load to virtual carriers in order to avoid congestion.

Dynamic load balancing can be applied seamlessly with the presented concept of virtual carriers, because all receivers are locked on the aggregate physical carrier whose symbol rate is not changed. In fact, only the amount of time slices selected by receivers is changed, having no effect on a lock/unlock behaviour. In the case of transmitting multiply physical carriers, in order to serve each satnet with a dedicate physical carrier, this seamless load balancing would not be possible as the symbol rates of the physical carriers would be changed, causing receivers to go out of lock.

The dynamic load balancing leads to significant capacity gains which we will illustrate with a numerical example. In a satnet traffic to multiple terminals (earth station receiver devices in the FWD link) is multiplexed in the same virtual carrier. In a broadband network each terminal typically serves multiple broadband users. For example, such a terminal can be a WiFi tower in a village or an airplane, serving multiple users logging to the WiFi hotspot. The statistical multiplexing gain presented below exploits the fact that the probability of buffering data beyond an acceptable limit drops dramatically as the number of multiplexed sources increases (B. Maglaris et al., 1988, Performance models of statistical multiplexing in packet video communications, IEEE transactions on communications, 36(7), pp. 834-844). More specifically, internet traffic is "bursty"—there are periods when a user downloads at a high rate, but often users download almost nothing. Because of statistical independence of multiple users it is unlikely that all sources are simultaneously downloading and, thus, designing a server to serve at a rate corresponding to the maximum sum rate of all the sources would be very wasteful.

For example, a single user consumes on average 20 kbps with a peak download rate of 2 Mbps. That is, the peak rate is 100 times the average rate. If a single user would be served with a dedicate carrier, and the peak rate would be subject to a service level agreement (SLA), then the average use of this carrier would be only 1%. In practice, the contract with the user specifies a probability of 95% that its SLA is achieved. Assuming a Poisson distribution of the user traffic (J. Cao et al., 2003, Internet traffic tends toward Poisson and independent as the load increases, Nonlinear estimation and classification (pp. 83-109), Springer, New York), it can be derived that the average use of this carrier would be only 4.8%. Hence, if the average rate of my network is 20 kbps, a carrier of 416.66 kbps needs to be provisioned, which is very inefficient.

As mentioned above, the probability that two users ask a peak rate at the same time is small. Due to the 95% specification that an SLA must be guaranteed, the average use of a carrier increases to 6.6% if two users with each 20 kbps are multiplexed in the same carrier. More specifically, a carrier of 606 kbps is needed to carry on average 40 kbps, while achieving the peak rate SLA in 95% of the time.

Now consider the difference between six virtual carriers of 80 Mbaud each (in a physical carrier of 480 or 481 Mbaud) with the alternative of generating six physical carriers of 80 Mbaud each. In the latter each satnet conveys 80 Mbaud. Depending on the modcod this corresponds to an amount of Mbps. For example, with an average efficiency of three bits per symbol, this satnet conveys 240 Mbps. From the statistical multiplexing theory, it can be derived that this peak rate allows carrying 83.4% of average throughput, or, 200 Mbps can be carried on average, allowing to multiplex 10.000 users of each 20 kbps, while achieving their 2 Mbps SLA 95% of the time. Hence, the six physical carriers of 80 Mbaud could serve 60.000 users in total.

In the presented invention dynamic load balancing allows for a statistical multiplexing effect over the entire physical carrier, as a virtual carrier can resize in the case of congestion, as it is unlikely that all virtual carriers are congested at the same time. Hence, assuming again an efficiency of three bits per symbol, and thus considering the total peak rate of 480*3=1.44 Gbps, leads to an achievable 92.9% of that carrier for average throughput, or 1.34 Gbps, allowing to serve 67.000 users in total, or 11.66% more than without dynamic load balancing with time slicing.

Above it was explained that, for a given throughput limit specified in Mcbps, the maximum symbol rate depends on the modcods used. E.g., for a 258 Mcbps and two slices per virtual carrier, the throughput limit is 127, 105, 82 for 16-APSK, 32-APSK, 64-APSK, respectively. It was also explained that different modcods in the same virtual carrier can achieve different symbol rates. Hence, when one alternates a 16-APSK modcod and a 64-APSK modcod in a virtual carrier, the symbol rate achieved by the 16-APSK modcods is at most (depending on the tiling loss) 127 Mbaud and the symbol rate achieved by the 64-APSK modcods is at most 82 Mbaud, provided that the physical carrier symbol rate is greater than or equal to 127 Mbaud (hence in the slice limited mode). So, in that case, the average symbol rate is the average of 127 and 82 Mbaud. Hence, the achievable symbol rate depends on the mixture of modcods in a virtual carrier.

It was also explained that in the slice limited mode, the tiling loss from non-limited frames or other virtual carriers reduces the achievable symbol rate. The tiling loss varies and depends on the modcods in the other virtual carriers, but a worst-case tiling loss can be predicted. Hence, in the slice limited mode the achievable symbol rate depends on the mixture of modcods and on the tiling loss. The achievable symbol rate will thus follow a particular probability density function.

As there is a need to maximize satnet sizes shaped by the shaper-encapsulators (in order to minimize the required capital expenditures in satnet processors and to maximize statistical multiplexing efficiency gains), there is an interest to provision a higher virtual carrier symbol rate than the worst case achievable virtual carrier symbol rate. The worst-case symbol rate is the highest symbol rate that can always be achieved, hence when the highest modulation and coding is always transmitted and this in the presence of the worst-case tiling loss. As explained further, simulations and measurements have shown that, most of the time, significantly higher symbol rates than the worst-case symbol rate can be achieved in the slice limited mode. However, it is important to reduce the symbol rate at moments when the current symbol rate cannot be achieved and thus results in queuing in the storage means at the input of the modulator. This can e.g., be due to a change in the modcod mixture, for instance in the presence of fading or mobility (when terminals change from one satnet to another satnet).

Figure 9:
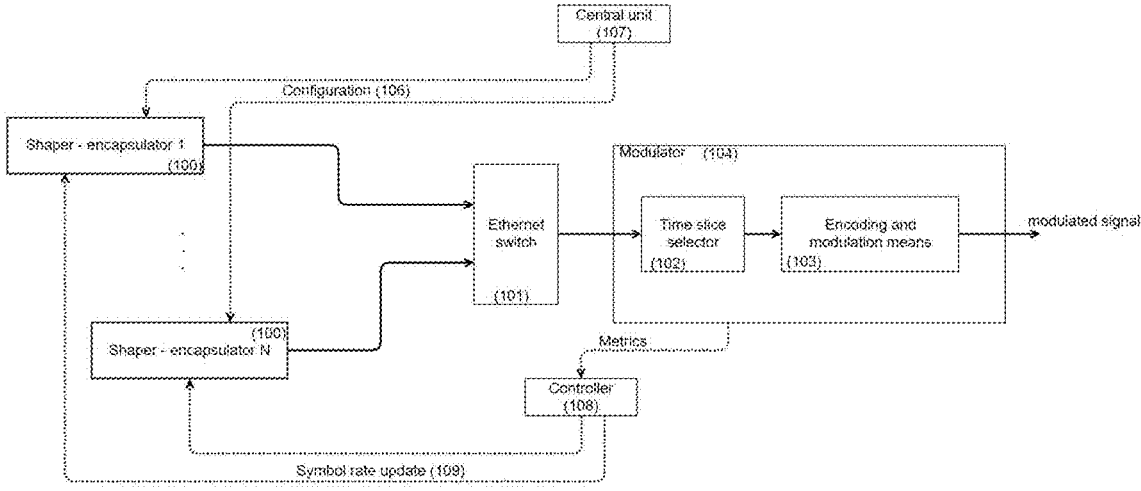
FIG. 9 illustrates a possible embodiment of a transmitter device comprising a controller for updating the symbol rate.

The transmitter device comprises a controller (108) responsible for updating the symbol rate, per satnet, based on one or more metrics fetched from the modulator and for providing this updated symbol rate to the shaper-encapsulator. A possible embodiment is illustrated in FIG. 9. The controller can be inside the modulator or can be an external component in embodiments of the transmitter device. The symbol rate feedback to the shaper-encapsulators can be provided in many different forms and the invention is not limited to a particular form of feedback. E.g., it can be provided in the form of a rate, or in an absolute number of frequently requested symbols, resulting in a 'rate' as well, or in a frequently requested number of bits, or in any other equivalent form. The update of the symbol rate can be based on a variety of metrics. For instance, the controller (108) can monitor the queue size of the storage means. Simply put, the higher the queue size (meaning that the current symbol rate is too high, e.g., due to tiling loss from non-limited frames or other virtual carriers, or due to the actual modcod mix in the virtual carrier), the more the symbol rate should be reduced.

In the presence of a roughly constant queuing (there is typically always queuing as the input from the shaper-encapsulator is bursty over a 10 Gbps link, while the output is not bursty), the controller may decide to increase the symbol rate and then monitor whether the updated symbol rate does not lead to an increase of the queue size. So, queue size monitoring can be used both to increase and to decrease the queueing. As mentioned above, the queue size varies a lot due to the bursty input to the modulator. So, state-of-the-art techniques can be used to perform processing on the queue size, e.g., to compute an average queue size as an input the decision to increase or decrease the symbol rate. Another embodiment of processing is for instance to compute not only an average but also a standard-deviation (or any other statistical moment of the queue size as a random variable) and also take that into account (resulting in a Kalman filter).

Another metric that can be monitored and used is the processed number of fill frames inserted in the virtual carrier. When fill frames are inserted, this means the virtual carrier is not filling the provided throughput limit and more symbols could be sent every second. Hence, the processed number of fill frames added per virtual carrier can be used as a metric to increase the virtual carrier symbol rate. It can also be used to decrease the virtual carrier symbol rate. For instance, if the amount of fill frames inserted is decreasing, this can be interpreted as an indication that the achievable virtual carrier symbol rate is decreasing (e.g., due to a change of modcod mix during a fading event for instance) and, even before queuing starts to happen, the virtual carrier symbol rate can be reduced to anticipate for a further decrease of the achievable virtual carrier symbol rate. When the number of fill frames inserted is not decreasing and is above a predetermined value, the virtual carrier symbol rate can be increased for instance.

The goal of the symbol rate change is to achieve a "target metric". E.g., for a virtual carrier symbol rate of 140 Mbaud, the target for the processed number of fill frames inserted per 50 ms is 15; the target for the processed queue size is 80 frames. More formalized, the processed metrics can for example be used in a proportional-integral-derivative controller to obtain an updated symbol rate. The controller can look at the error of the measurement of the metric (e.g., the processed number of fill frames, the processed queue size or a combination of both) compared to its target. The difference between the target and the measurement of the metric is proportionally compensated in the updated symbol rate: a larger difference results in a proportionally larger compensation to the updated symbol rate. The integral action takes into account the accumulated difference. More specifically, if the difference of the current metric compared to the target metric is high for a long period of time, the controller compensates more. The final derivative action takes into account changes in the difference counteracting the change, to make sure the controller doesn't overreact to changes.

Obviously, in some embodiments the controller can process a combination of fill frames and/or queuing sizes to decide on how to adapt the symbol rate.

Figure 10:
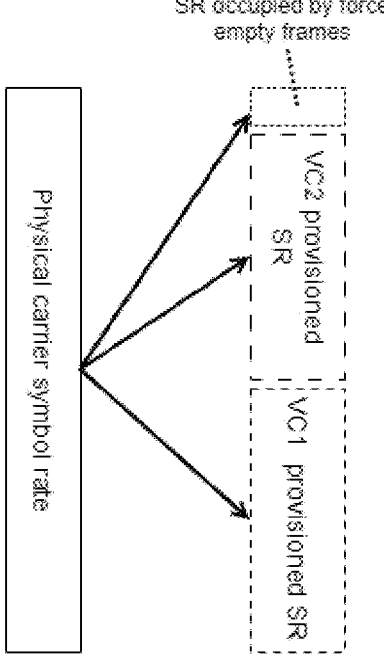
FIG. 10 illustrates virtual carriers receiving so-called provisioned symbol rates.

Above, a feedback loop was described between the modulator and shaper-encapsulators, implemented by a controller, to allow for increased virtual carrier symbol rates, while being robust to fading events or changes in the environments leading to different achievable virtual carrier symbol rates. There are several ways to roll this out to the customer. For instance, starting values can be used for the virtual carrier symbol rates to determine the number of satnets in a physical carrier. When the system starts operating, the feedback loop makes sure that the starting values are decreased when they are too high for instance. The starting values can be called "provisioned" virtual carrier symbol rates. FIG. 10 provides an illustration of virtual carriers VC1 and VC2 being given a provisioned virtual carrier symbol rate. The provisioned virtual carrier symbol rates can be based on clear-sky link budgets, the clear-sky modcod mix in each of the satnets could be predicted and the achievable virtual carrier symbol rate can be measured in the lab for instance to determine starting values. Alternatively, a calculation can be made to predict the achievable virtual carrier symbol rate for a particular customer situation. In yet another alternative the same symbol rates can be taken as those achievable in the physical carrier symbol rate limited mode. Obviously, different methods can be employed to determine the provisioned virtual carrier symbol rates. In a preferred embodiment, to maximize the satnet sizes, the clear-sky default situation is emulated on a_lab setup to determine the highest possible virtual carrier symbol rate that can be achieved most of the time (e.g., 99% of the time). The invention is however not limited hereto. In general, any starting value higher than the worst-case values used without the feedback loop is an improvement.

Further, it is to be noted that the provisioned virtual carrier symbol rate can be dynamically adjusted for load balancing reasons.

Figure 11:
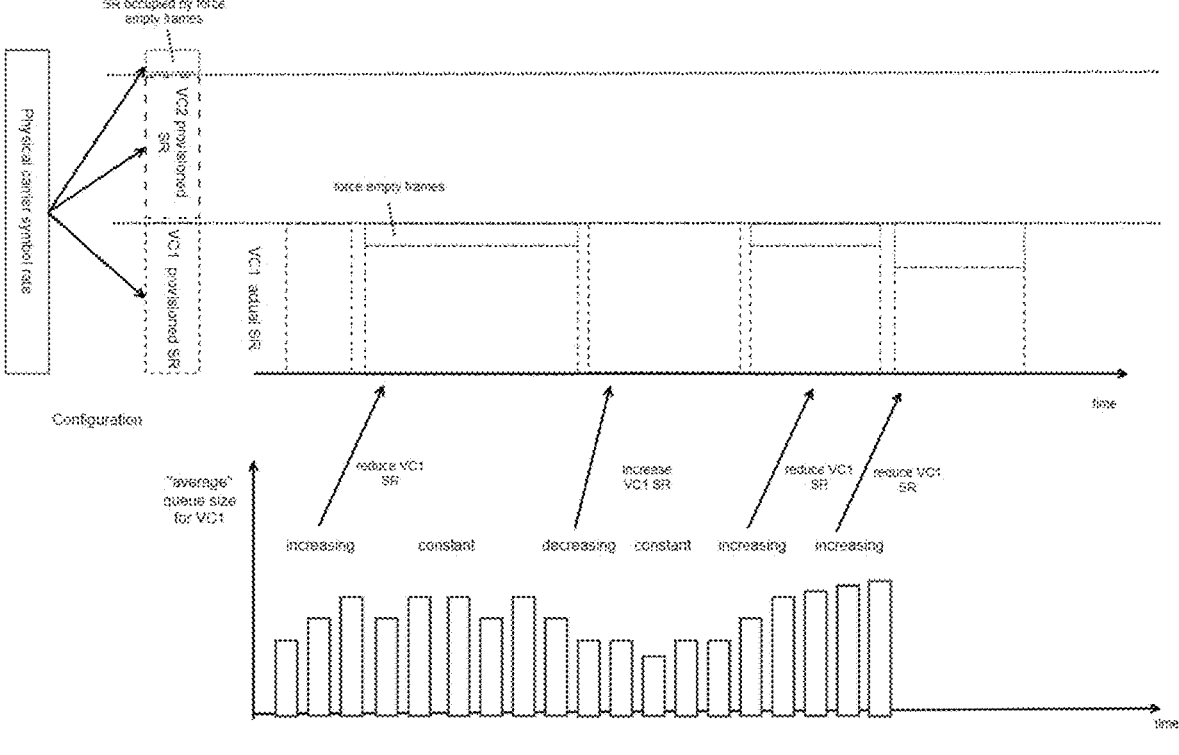
FIG. 11 illustrates the variation of the actual symbol rate of a virtual carrier based on the average queue size for that virtual carrier.

FIG. 11 shows an example of how the actual symbol rate of virtual carrier VC1 is varied based on the average queue size for VC1. It can be seen that when the average queue size of VC1 grows, the symbol rate of the virtual carrier is reduced and vice versa. Similarly, the actual symbol rate of the virtual carrier can be modified by monitoring the number of fill frames inserted in the virtual carrier.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:
1. An earth station transmitter device arranged for generating a signal to be transmitted to a plurality of earth station receiver devices of a satellite communication system, said earth station transmitter device comprising a plurality of shaping means, each arranged for shaping for data traffic to a different subset of earth station receiver devices a symbol rate, so obtaining for each subset a group of time slices outputting at said symbol rate for said group of time slices a plurality of baseband frames, and for encapsulating said data traffic, a modulator comprising a time slice selector arranged for receiving and storing in storage means said groups of time slices outputted by said plurality of shaping means, for selecting a stored baseband frame of a group of time slices from a list of allowable groups of time slices as next frame to be multiplexed on a single stream, and for assigning to said selected baseband frame, from a list of allowable time slice numbers, a time slice number associated to the group of time slices to which said selected baseband frame belongs, said modulator further comprising encoding and modulation means to convert said single stream of baseband frames into symbols of a continuous physical carrier to be transmitted at a physical carrier symbol rate greater than or equal to the sum of said symbol rates of said groups of slices, a controller adapted to monitor said modulator and to convey to at least one of said shaping means based on said monitoring an update of said symbol rate shaped by said at least one of said shaping means.

2. The earth station transmitter device as in claim 1, wherein said update is a reduced symbol rate if a processed queue size of said storage means is increasing.

3. The earth station transmitter device as in claim 1, wherein said update is an increased symbol rate if a processed queue size of said storage means is decreasing or remains constant.

4. The earth station transmitter device as in claim 1, wherein said update is a reduced symbol rate if a processed number of fill frames inserted into said group of time slices of said at least one shaping means is decreasing.

5. The earth station transmitter device as in claim 1, wherein said update is an increased symbol rate if a processed number of fill frames inserted into said group of time slices of said at least one shaping means is equal to or greater than a given threshold value.

6. The earth station transmitter device as in claim 1, comprising a central unit arranged for configuring each shaping means of said plurality with a provisioned symbol rate for its group of time slices and for conveying to said modulator a list of possible time slice numbers for each of said groups of time slices.

7. The earth station transmitter device as in claim 6, wherein said updated symbol rate is upper bounded by said provisioned symbol rate of said at least one shaping means.

8. The earth station transmitter device as in claim 6, wherein said provisioned symbol rate of at least one of said groups of time slices is upper bounded depending on the most efficient modulation and coding used in that group of time slices.

9. The earth station transmitter device as in claim 1, wherein said central unit is also arranged for conveying to said time slice selector indications of throughput limits per time slice number.

10. The earth station transmitter device as in claim 1, wherein said encoding and modulation means is arranged to send a request to said time slice selector to get said next selected baseband frame.

11. The earth station transmitter device as in claim 1, wherein said controller is adapted to monitor the modulator, by monitoring at least one of the queue size of said storage means or the number of inserted fill frames.

12. A satellite communication system comprising an earth station transmitter device as in claim 1 and a plurality of earth station receiver devices, wherein at least one earth station receiver device of said plurality is arranged to demodulate and decode said symbols of said physical carrier only at a rate lower than said physical carrier symbol rate, said plurality of earth station receiver devices being divided in at least two subsets, each subset corresponding to a different one of said groups of time slices.

13. The satellite communication system as in claim 12, wherein said time slice selector is arranged for selecting a non-limited frame to be put in said single stream in case there are no allowed virtual carriers.

14. The satellite communication system as in claim 13, wherein said non-limited frame is a frame that is forced into said single stream by said time slice selector and is rejected by said plurality of earth station receiver devices, said frame comprising a header identifying said frame as a dummy frame.

15. The satellite communication system as in claim 12, wherein said time slice selector is arranged for selecting a fill frame to be put in said single stream in case there are allowed virtual carriers and there is no baseband frame available in said storage means for said allowed virtual carriers.

16. The satellite communication system as in claim 12, where said list of allowable groups of time slices comprises groups of time slices having at least one time slice number on said list of allowable time slice numbers.

17. The satellite communication system as in claim 12, where said list of groups of time slices comprises groups of time slices for which at least one further counter exceeds a second threshold related to a jitter specification on an earth station receiver device of said plurality that can lead to frame reordering, said second counter arranged to count a number of symbols transmitted as of the last outputted baseband frame assigned to said group of time slices.

18. The satellite communication system as in claim 12, where said central unit is arranged to indicate to a first shaping-encapsulation means an increased provisioned symbol rate, based on congestion of a corresponding satnet, and to indicate a decreased provisioned symbol rate to at least one other shaping-encapsulation means, such that said physical carrier symbol rate is greater than or equal to the sum of the provisioned symbol rates of all groups of time slices.

19. The satellite communication system as in claim 18, where said central unit is arranged to first indicate a decreased provisioned symbol rate to said at least one other shaping-encapsulation means, before indicating an increased provisioned symbol rate to said first shaping-encapsulation means.

* * * * *